United States Patent [19]

Kimura

[11] Patent Number: 5,383,444
[45] Date of Patent: Jan. 24, 1995

[54] SLICING MACHINE

[75] Inventor: Yoshihiko Kimura, Ibaraki, Japan

[73] Assignee: Mitsubishi Materials Corporation, Tokyo, Japan

[21] Appl. No.: 54,267

[22] Filed: Apr. 30, 1993

Related U.S. Application Data

[63] Continuation-in-part of Ser. No. 860,097, Mar. 30, 1992, abandoned.

[30] Foreign Application Priority Data

Sep. 30, 1991 [JP] Japan .................. 3-252576

[51] Int. Cl.⁶ .............................. B28D 1/04
[52] U.S. Cl. ......................... 125/13.02; 451/8
[58] Field of Search .................. 125/13.01, 13.02; 51/165.74, 165.75, 5 B, 5 C

[56] References Cited

U.S. PATENT DOCUMENTS

| | | |
|---|---|---|
| 2,914,100 | 11/1959 | Lindholm . |
| 3,327,696 | 6/1967 | Aiken et al. .................. 125/13.01 |
| 4,537,177 | 8/1985 | Steere, Jr. et al. . |
| 4,567,798 | 2/1986 | Brdicko . |
| 4,971,021 | 11/1990 | Kubotem et al. . |
| 4,991,475 | 2/1991 | Malcok et al. ............... 125/13.02 |
| 5,025,593 | 6/1991 | Kawaguchi et al. ........... 51/165.77 |
| 5,036,274 | 7/1991 | Seeburger . |
| 5,074,276 | 12/1991 | Katayama . |

FOREIGN PATENT DOCUMENTS 432637  6/1991  European Pat. Off. .
016792  2/1979  Japan .

OTHER PUBLICATIONS

English Abstract of JP 3121769, Taga Shoichi et al, May 1991, "High Precision Slicing Machine".
English Abstract of JP 61047644, Chikaoka Ryosaku et al, Mar. 1986, "Method for Controlling Warpage of Blade for Slicer".
"System for Controlling Saw Blade Excursions During the Slicing of Slicon Crystals", JBM Tech Disclosure Bulletin No. 25, No. 5, Oct. 1992, Carufe et al.

Primary Examiner—Maurina T. Rachuba
Attorney, Agent, or Firm—Cushman, Darby & Cushman

[57] ABSTRACT

The slicing machine of the present invention comprises a center blade-position detecting sensor arranged opposite a cutting area of an annular blade with a partially cut slice disposed between the center sensor and the cutting area of the blade. Two side blade-position detecting sensors are also provided at both sides of the center sensor and opposite the side adjacent areas of the cutting area. Three electromagnets are provided at corresponding positions to the sensors respectively, in order to control the deviations of the blade at each measuring point in accordance with the output signals of the sensors. Furthermore, a controlling device is provided in order to control currents to be supplied to the electromagnets in accordance with output signals from the sensors.

18 Claims, 16 Drawing Sheets

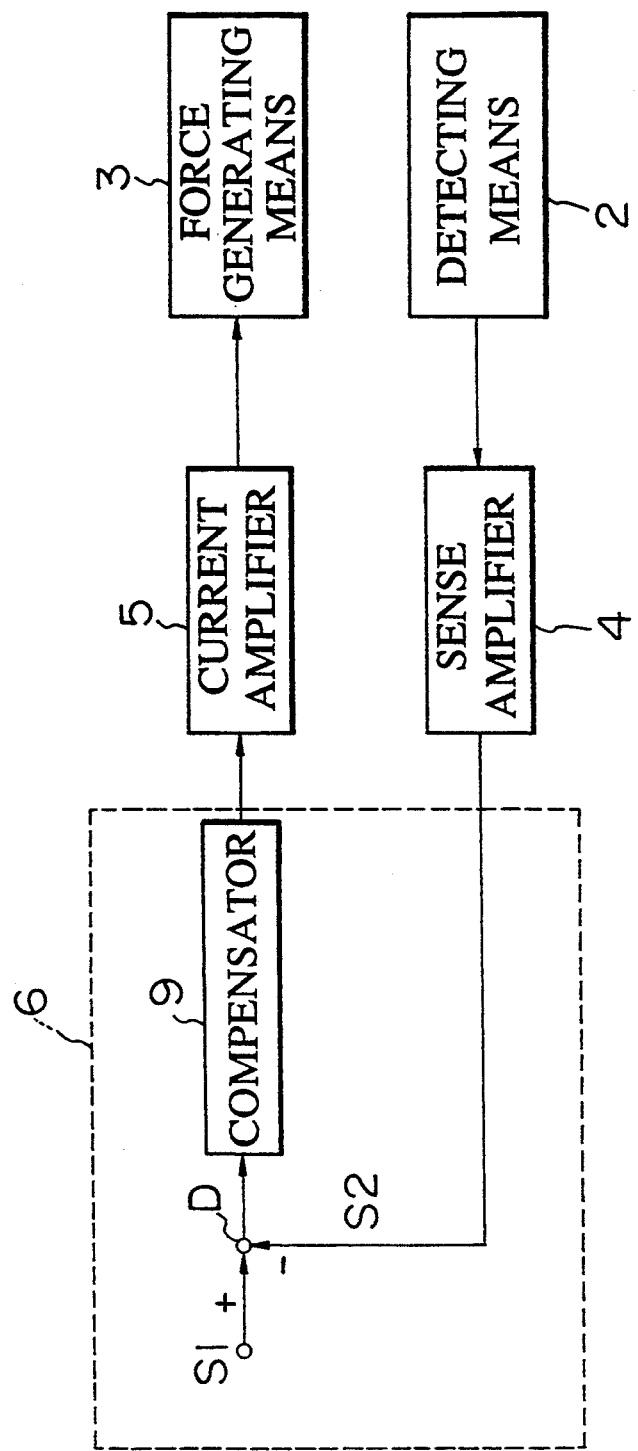

DIRECTION OF ROTATION

SLICING MACHINE

This is a continuation-in-part application of U.S. patent application Ser. No. 07/860,097 filed Mar. 30, 1992, now abandoned.

BACKGROUND OF THE INVENTION

1. Field of the Invention

The present invention relates to a slicing machine, especially an internal diameter slicing machine which successively slices a workpiece such as a single-crystal semiconductor ingot into wafers of a predetermined thickness by means of a circular-shaped internal rotary blade.

2. Background Art

Slicing machines used for cutting a block into slices, especially cutting a single-crystal semiconductor ingot in the form of a bar into wafers, generally comprise a feed-table to carry the bar to be sliced by the blade. The feed-table carrying the bar moves in the horizontal direction for cutting and then moves upward against the blade during cutting. This blade has a cutting edge formed along the inner-edge thereof.

For producing a wafer having a flat surface, it is important to control the position of the cutting edge of the blade during the slicing process. Therefore, a deviation detecting and correcting means have been required for slicing the bar with high accuracy.

In Japanese Patent Application KOKAI number HEI3-121769, there is disclosed for example, a slicing machine having: a detecting means for detecting a deviation of the blade in the width direction of the blade i.e., in the horizontal direction of the workpiece to be sliced; at least one pair of magnetic force generating means distributed to each side of the blade and generating magnetic forces extending toward the blade; and control means operably connected to the detecting means and the magnetic force generating means for measuring the intensity of a magnetic force applied on the blade for controlling the intensity of the magnetic force such that the cutting edge of the blade is positioned in the correct cutting position.

However, the detecting means of the above described conventional slicing machine is fixed at a point at the beginning of the slicing process and/or at a point at the end of the slicing process, therefore, it is difficult to directly measure the position of the cutting edge of the blade in the workpiece. Thus the cutting accuracy of the conventional slicing machine is still not satisfactory because the deviation detecting and correcting means may put the cutting edge in the wrong orientation by detecting vibrations or curvature in the blade's surface.

SUMMARY OF THE INVENTION

It is therefore an object of the present invention to provide a slicing machine which can slice a workpiece with a high accuracy by keeping a cutting edge of a blade on a desired cutting line during a slicing process by means of detecting and correcting the deviation of the blade directly through a partially-cutting slice.

In order to achieve the object, the first slicing machine of the present invention comprises:

(a) a circular-shaped blade made of a ferromagnetic material, having an opening in the center thereof, and having a cutting edge at the inner peripheral margin thereof;

(b) blade rotating means for maintaining tension in the blade and rotating the blade around the central axis thereof;

(c) work supporting means for supporting the workpiece and positioning the workpiece inside the opening of the blade;

(d) moving means for moving the work supporting means or the blade rotating means in order to slice the workpiece by the blade;

(e) center blade-position detecting means for measuring a displacement, towards the direction of the central axis of the blade, of a cutting area of the blade inserted in the workpiece, wherein the detecting means is arranged opposite the cutting area of the blade with a partially cut slice disposed between the detecting means and the cutting area of the blade;

(f) center magnetic force generating means for attracting the cutting area of the blade by generating magnetic force, wherein the magnetic generating means is arranged opposite the cutting area of the blade with the partially cut slice disposed between the magnetic force generating means and the cutting area of the blade and;

(g) controlling means for controlling the magnetic force generated by the magnetic force generating means in accordance with an output signal from the blade-position detecting means.

According to the first slicing machine of the present invention, it is possible not only to directory measure the deviation of a cutting area of the blade which is actually inserted in the workpiece, but also to directory shift the cutting area of the blade in accordance with the measured deviation through the partially cut slice. Therefore, the accuracy of the blade-position control can be improved.

The controlling means may be programed so as to shift the cutting area of the blade from a free position thereof, towards the center magnetic force generating means, to a predetermined initial position, by means of generating an initial magnetic force by the center magnetic force generating means before the beginning of a slicing operation, and can be further programed so as to adjust the initial magnetic force in accordance with the output signals from the center blade-position detecting means during the slicing operation.

In this case, during the slicing operation, if the cutting area of the blade deviates from the initial position towards the central electromagnet, the controlling means decreases the current to be supplied to the center electromagnet, therefore, the cutting area can be returned to the initial position by means of the elasticity of the blade. Inversely, if the cutting area deviates from the initial position towards the opposite direction of the center magnetic force generating means, the controlling means increases the magnetic force in order to attract the cutting area to the initial position. Therefore, the position of the cutting area of the blade can be controlled in both directions along the central axis of the blade.

The center magnetic force generating means may comprise at least one electromagnet which is arranged opposite the cutting area of the blade with the partially cut slice disposed between the electromagnets and the cutting area of the blade.

Furthermore, the controlling means may be programed so as to shift the cutting area of the blade from a free position thereof, towards the center magnetic force generating means, to a predetermined initial position, by means of supplying an initial current to the electromagnet before the beginning of a slicing operation, and further, may be programed so as to adjust the initial current in accordance with the output signals from the center blade-position detecting means during the slicing operation.

In this case, during the slicing operation, if the cutting area of the blade deviates from the initial position towards the magnetic force generating means, the controlling means decreases the current to be supplied to the center electromagnet, therefore, the cutting area can be returned to the initial position by means of the elasticity of the blade. Inversely, if the cutting area deviates from the initial position towards the opposite direction of the center magnetic force generating means, the controlling means increases the current in order to attract the cutting area to the initial position. Therefore, the position of the cutting area of the blade can be controlled in both directions along the central axis of the blade.

In addition to the above-mentioned features, the slicing machine may further comprise:

(h) at least one side magnetic force generating means for attracting side adjacent areas of the cutting area of the blade by generating magnetic force, wherein each of the side magnetic force generating means are disposed apart from the center magnetic force generating means along the circumferential direction of the blade, and are opposed to each of the side adjacent areas of the blade;

(i) at least one side blade-position detecting means for measuring displacements of the side adjacent areas in the direction of the central axis of the blade, wherein each of the side blade-position detecting means are disposed apart from the center blade-position detecting means along the circumferential direction of the blade, and are opposed to the side adjacent area of the blade;

(j) controlling means for controlling the magnetic force generated by each of the center and side magnetic force generating means in accordance with output signals from the center and side blade-position detecting means.

In this case, it is possible to accurately adjust the deviations of at least two points of the blade which are opposite the center and side blade-position detecting means, during the whole slicing operation. Therefore, the flatness of the cutting plane of the workpiece can be improved in comparison with the case where blade-position control is executed at one point only. Additionally, rather than improving the flatness of the wafers, it is also possible to produce wafers having a desired warp or desired irregularities in flatness.

The controlling means may further comprise:
initial magnetic force calculating means for calculating each initial magnetic force to be generated by each of the electromagnets of the center and side magnetic generating means, in order to respectively shift the cutting area and side adjacent areas of the blade to predetermined desired positions;
deviation calculating means for calculating deviations in actual positions from the desired positions of the cutting area and side adjacent areas of the blade;
compensating magnetic force calculating means for calculating each compensating magnetic force to be added to the initial magnetic force of each of the electromagnets in accordance with the deviations;
total magnetic force calculating means for respectively calculating the total magnetic force by adding each of the compensating magnetic forces to the corresponding initial magnetic forces;
current calculating means for calculating current to be supplied to each of the electromagnets of the center and side magnetic force generating means in order to generate the total magnetic forces by the magnets respectively and;
current supply means for supplying the currents to corresponding electromagnets of the-center and side magnetic generating means.

In this case, the initial magnetic force calculating means calculates the initial magnetic forces to be generated by the electromagnets respectively, in order to shift the cutting area and side adjacent areas of the blade to the desired positions. On the other hand, the deviation calculating means calculates the deviations of the blade from the desired positions, and the compensating magnetic force calculating means calculates the compensating magnetic force to be added to the initial magnetic force in accordance with the deviations. The total magnetic force calculating means respectively calculates the total magnetic forces by adding each of the compensating magnetic forces to the corresponding initial magnetic forces. Furthermore, the current calculating means calculates the currents to be applied to the electromagnets in order to generate the total magnetic forces by the electromagnets, and the current supply means supplies the currents to the corresponding electromagnets respectively. By means of such a feedforward by the initial magnetic force calculating means, it is possible to improve the positional stability of the blade, in comparison with the case where feedforward is not used.

The center and side magnetic generating means are preferably arranged at the same distance from the central axis of the blade, and further, the center and side blade-position detecting means are preferably arranged at the same distance from the central axis of the blade on the inner side of the center and side magnetic generating means, in order to avoid magnetic disturbances to the detecting means.

Each of the magnetic generating means may have a housing made of a soft magnetic material, at least one core made of the soft magnetic material which is fixed in the housing, and coils installed on each of the cores.

The center magnetic force generating means and the center blade-position detecting means can be fixed on a support, and a moving means can be provided for moving the support towards the direction of the central axis of the blade. In this case, since the center magnetic force generating means and the center blade-position detecting means can be moved back from the blade, when the first slice of a new ingot is performed (the first slice of a workpiece usually has an irregular thickness), the interference of these devices and the workpiece is avoidable.

instead of the electromagnet, the magnetic force generating means may comprise a permanent magnet arranged opposite the cutting area of the blade with the partially cut slice disposed between the permanent magnet and the cutting area of the blade, and a magnet actuating means for moving the permanent magnet in the direction of the axis of the blade. In this case, the blade-position control is performed by means of moving the permanent magnet in the direction of the axis of the blade.

Each of the blade-position detecting means can be an eddy current sensor.

Instead of generating an initial magnetic force, it is possible to form the cutting edge of the blade so that the cutting direction of the blade in the workpiece will deviate from the direction perpendicular to the central axis of the blade and towards the opposite side of the magnetic force generating means.

BRIEF DESCRIPTION OF THE DRAWINGS

FIG. 3 is a block diagram illustrating the control system of the first embodiment.

DETAILED DESCRIPTION OF THE PREFERRED EMBODIMENT

Figure 1:
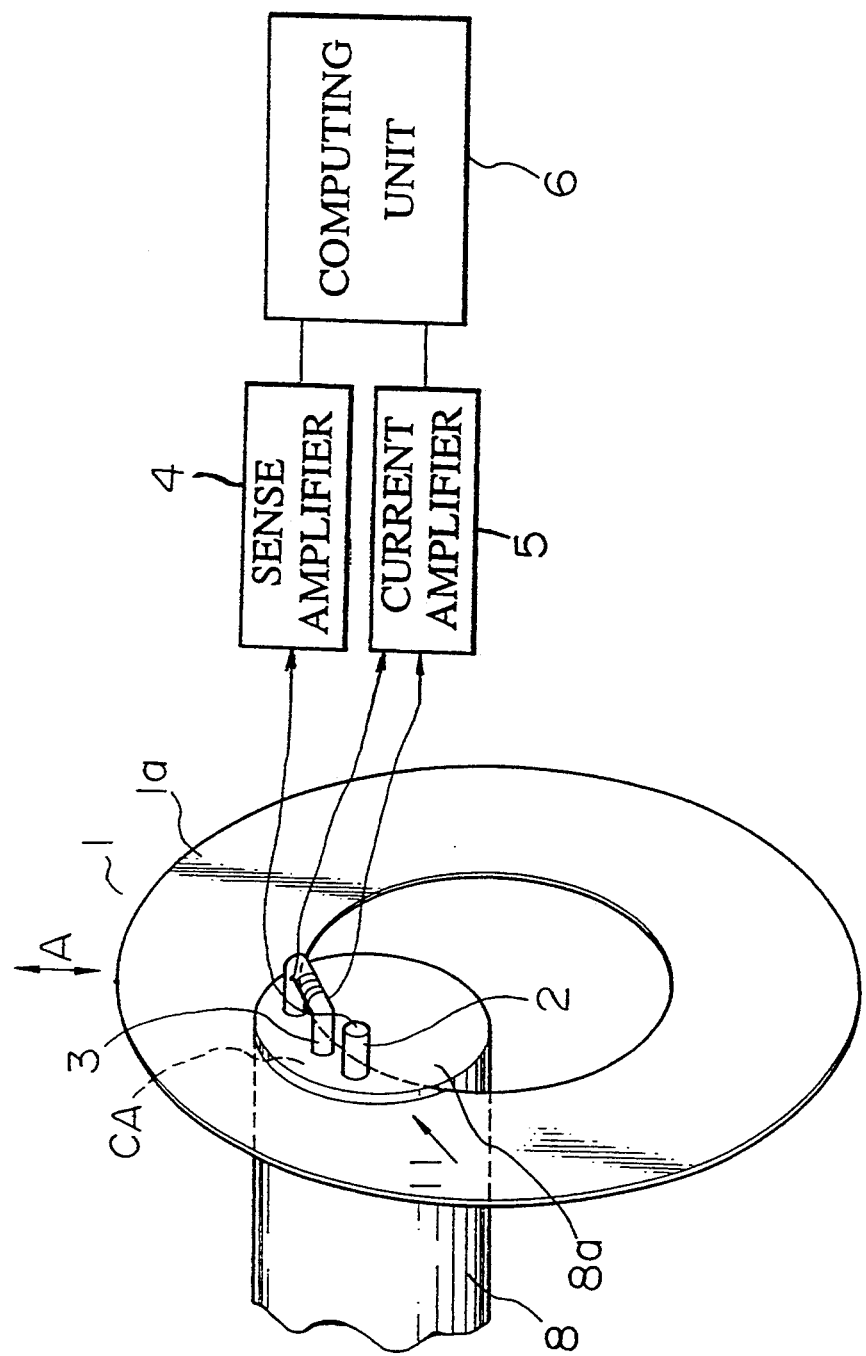
FIG. 1 is a schematic view of the slicing machine according to the first embodiment of the present invention.
Figure 2:
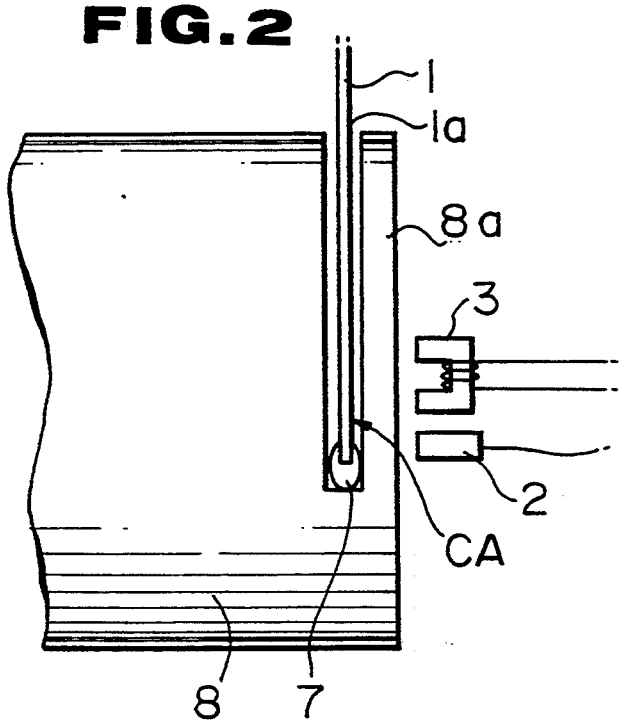
FIG. 2 is a side view of the vicinity of the blade as seen in the direction indicated by the arrow 11 in FIG 1.

Referring to FIGS. 1 and 2, there is illustrated a slicing machine according to the first embodiment of the present invention, which comprises a circular-shaped internal rotary blade 1, a blade-position detecting means 2, a magnetic force generating means 3, and a control means 4, 5 and 6.

The circular-shaped internal rotary blade 1 includes an annular thin body having a central opening and an abrasive layer deposited on an inner periphery of the body for serving as a cutting edge 7. The body of the blade 1 is made of a ferromagnetic material selected from a group of austenite type stainless steel (AISI301, 304), precipitation hardening type stainless steel (17-7PH) and the like, in which a martensite phase can be generated by cold-working, but is not limited to these materials. The abrasive layer 7 contains abrasive grains, such as diamond, embedded in a bond matrix.

The outer periphery of the blade 1 is coaxially fixed to a conventional annular spindle or rotary chuck (not shown) at tension, and the spindle or chuck is supported by a blade rotating means in order to rotate the blade 1 about the central axis thereof.

The detecting means 2 is movably located in a position opposed to a cutting area CA of the inner side of the blade 1 for measuring a deviation of the cutting edge 7 from a desired cutting line, with the partially cut slice 8a being disposed between the magnetic force generating means 3 and the detecting means 2. The detecting means 2 is, e.g., an eddy-current sensor which has been used for measuring distance from a detecting head of the sensor to a magnetic material by detecting eddy-current loss caused by immersing the magnetic material in the magnetic field formed by the detecting head.

In the present embodiment, the magnetic force generating means 3 comprises at least one electromagnet, which is located in a position opposed to the cutting area CA of the blade 1, and the magnetic force generating means 3 and the detecting means 2 are located in parallel as shown in FIG. 2. These means 2 and 3 are arranged so as to be adjacent to each other in the circumferential direction of the blade 1 and also separate from each other with a space being maintained therebetween which is sufficient to decrease magnetic interference between the means 2 and 3. Furthermore, each distance from the blade 1 to the detecting means 2 and the force generating means 3 is larger than the thickness of the wafer to be sliced.

The workpiece 8 to be sliced is made of a non-magnetic material or a insulating material, such as a semiconductor crystal ingot, but is not limited to such an ingot. A work supporting means (not shown) is provided for supporting and introducing the workpiece 8 into the opening of the blade 1 while keeping the workpiece 8 parallel to the direction of the central axis of the blade 1. Furthermore, a moving means (not shown) is provided for moving the work supporting means or the blade rotating means up and down in order to slice the workpiece 8 by the cutting edge 7 of the blade 1 in a direction A perpendicular to the central axis of the blade 1.

The control means of the present embodiment comprises a sense amplifier 4 connected to the detecting means 2, a current amplifier 5 connected to the force generating means 3, and a computing unit 6 connected to both amplifiers 4 and 5. The computing unit 6 is provided for receiving a first signal from the sense amplifier 4 and Judging whether the position of the cutting edge 7 is on the prescribed correcting path or not, and also sending a second signal to the force generating means 3 to correct the position of the blade 1.

FIG. 3 is a block diagram showing details of the control means. In the case where the blade 1 is slipped out of the desired cutting line, the detecting means 2 outputs a first signal to the computing unit 6 via the sense amplifier 4. In the computing unit 6, the judgment described above is performed by means of a deviation detecting point D and a compensator 9 having a phase-lag filtering mechanism.

The introduced signal S2 from the detecting means 2 is compared with a predetermined initial deviation S1 at the point D and the result of the comparison is converted as a second signal to be introduced into the compensator 9. The initial deviation S1 should be input to the computing unit 6 before the slicing operation or stored in the memory of the computing unit 6 in advance. An output signal from the compensator 9 is introduced in the force generating means 3 via the current amplifier 5.

In the case that the cutting area CA of the blade 1 deviates from the desired cutting line toward the detecting means 2, the detecting means 2 outputs a signal to the computing unit 6 to decrease the magnetic force to be applied on the blade 1 so that the cutting area CA returns to the desired cutting line. Conversely, if the cutting area CA of the blade 1 moves away from the detecting means 2, the detecting means 2 outputs a signal to the computing unit 6 to increase the magnetic force to be applied on the blade 1 so that the blade 1 is pulled back to the desired cutting line.

Figure 6:
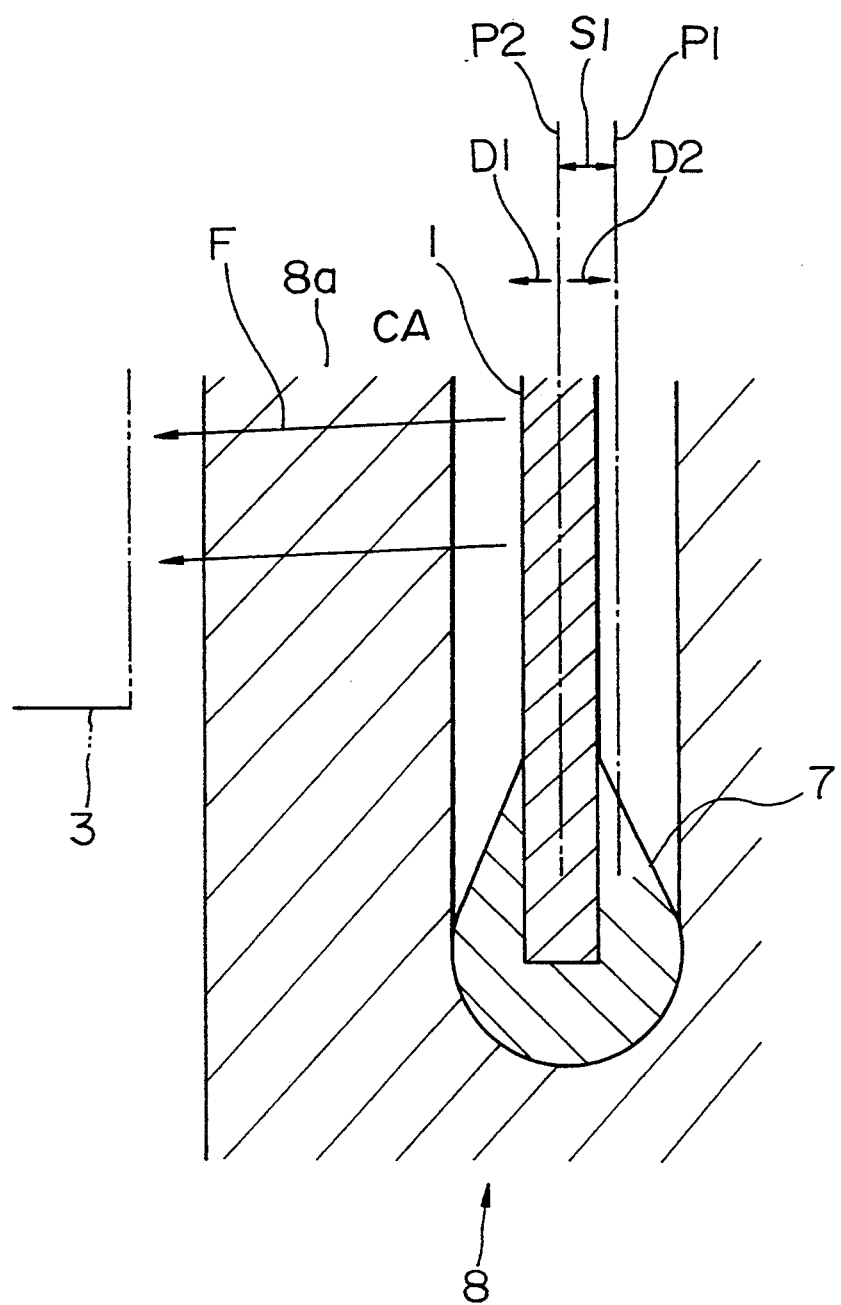
FIG. 6 is an enlarged cross section illustrating a method of blade-position control during cutting the workpiece.

FIG. 6 shows the effect of the controlling means in the present embodiment. In this figure, reference P1 shows a free position of the blade 1 in the case where no magnetic force is being applied on the blade 1, and P2 shows the desired cutting line (initial position), where the deviation of the blade 1 from the free position P1 is the initial deviation S1. In the present embodiment, by means of applying the initial deviation S1 to the blade 1 during the slicing process, it becomes possible to control the position of the blade 1 in both directions D1 and D2 along the central axis of the blade 1.

Where slicing the workpiece 8 using this slicing machine, after actuating the blade rotating means to rotate the blade 1, the controlling means is actuated for positioning the blade 1. At the beginning of the slicing operation, the blade 1 is located in the free position P1, the compensator 9 compares the predetermined initial deviation S1 and the actual deviation which is zero, and outputs a signal to attract the blade to the initial position P2. The signal is converted into a corresponding current in the current amplifier 5, the current is applied to the magnetic force generating means 3, and the magnetic force generating means 3 generates an initial magnetic force in order to elastically attract the cutting area CA of the blade 1 to the initial position P2.

After positioning the cutting area CA of the blade 1 to the initial position P2, the moving means is actuated to start the slicing of the workpiece 8 by the blade 1. During the slicing operation, if the cutting area CA of the blade 1 deviates from the initial position P2 towards the magnetic force generating means 3 (direction D1), the detecting means 2 detects the deviation and the compensator 9 outputs a signal to decrease the current to be applied to the magnetic force generating means 3. Therefore, the magnetic force attracting the blade 1 is decreased, the cutting area CA of the blade 1 elastically shifts towards the direction D2, and returns to the initial position P2. Conversely, if a deviation of the cutting area CA of the blade 1 toward the direction D2 occurs, the compensator 9 outputs a signal to increase the current to be applied to the magnetic force generating means 3. Therefore, the magnetic force attracting the blade 1 is increased, the cutting area CA of the blade 1 shifts towards the direction D1, and returns to the initial position P2.

Where cutting a semiconductor ingot, the initial deviation S1 is preferably determined in the range of 2-50 microns. If the initial deviation S1 is less than 2 microns, it is difficult to sufficiently compensate the deviation of the blade 1 toward the direction D1. Conversely, if the initial deviation S1 is more than 50 microns, it is difficult to sufficiently compensate the deviation towards the direction D2. However, the initial deviation S1 may be changed when cutting other materials, and is not limited to the above-mentioned range only.

The slicing machine of the present invention is not restricted to the exact descriptions and the figures of the above-mentioned embodiment.

Figure 4:
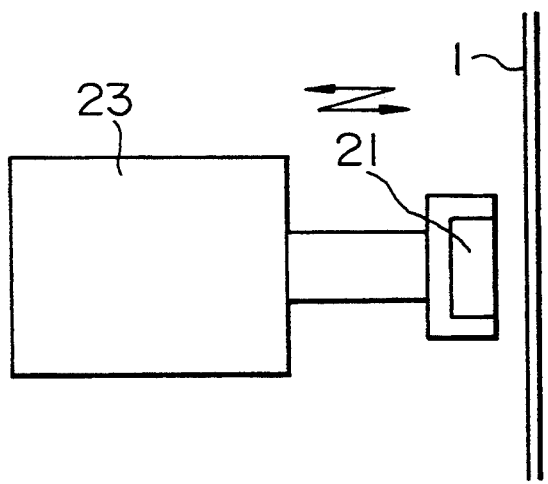
FIG. 4 is a schematic view of a modification of the magnetic force generating means of the present invention.

For example, as shown in FIG. 4, instead of using an electromagnet as the magnetic force generating means 3, it is possible to provide a magnetic force generating means which comprises a permanent magnet 21 and a magnet actuating means 23 for moving the permanent magnet 21 in the direction of the central axis of the blade 1. The permanent magnet 21 is arranged opposite the cutting area CA of the blade 1, and the partially cut slice disposed between the permanent magnet 21 and the cutting area of the blade 1. The magnet actuating means 21 can be controlled by the controlling unit 6 in the same way as the above-mentioned embodiment.

Also, it is preferable that the detecting means 2 and force generating means 3 are provided in the plural form for improving the accuracy of the cutting.

Figure 5:
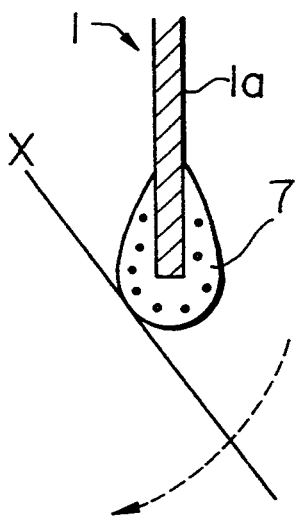
FIG. 5 is an enlarged cross section illustrating a method of dressing the cutting edge of the blade in order to deviate the cutting direction of the blade.

Furthermore, instead of always keeping the cutting area CA of the blade 1 at the initial position P2, the following modification is adoptable:

(i) The cutting edge 7 of the blade 1 can be formed so that the cutting direction of the blade 1 deviates from a direction perpendicular to the central axis of the blade 1 towards the opposite side of the magnetic force generating means 3. In order to deviate the cutting direction of the blade 1 in such a way, a partial dressing, as shown in FIG. 5 for example, is adoptable. By means of dressing the cutting edge 7 of the blade 1 using a conventional dressing means, e.g. dressing stick, along the inclined line X in FIG. 5, the blade will be characterized in that its cutting direction will deviate from the perpendicular direction as shown by the dotted line in FIG. 5. In this modified embodiment, the slicing operation is performed while counterbalancing the deviation of the dressed blade 1 by actuating the magnetic force generating means 3. In the case where the cutting area CA of the blade 1 deviates from the desired cutting line towards the magnetic force generating means 3, the deviation can be canceled by decreasing the magnetic force attracting the blade 1. Also, should a deviation in the direction D2 occur, the deviation can be canceled by increasing the magnetic force.

Figure 7:
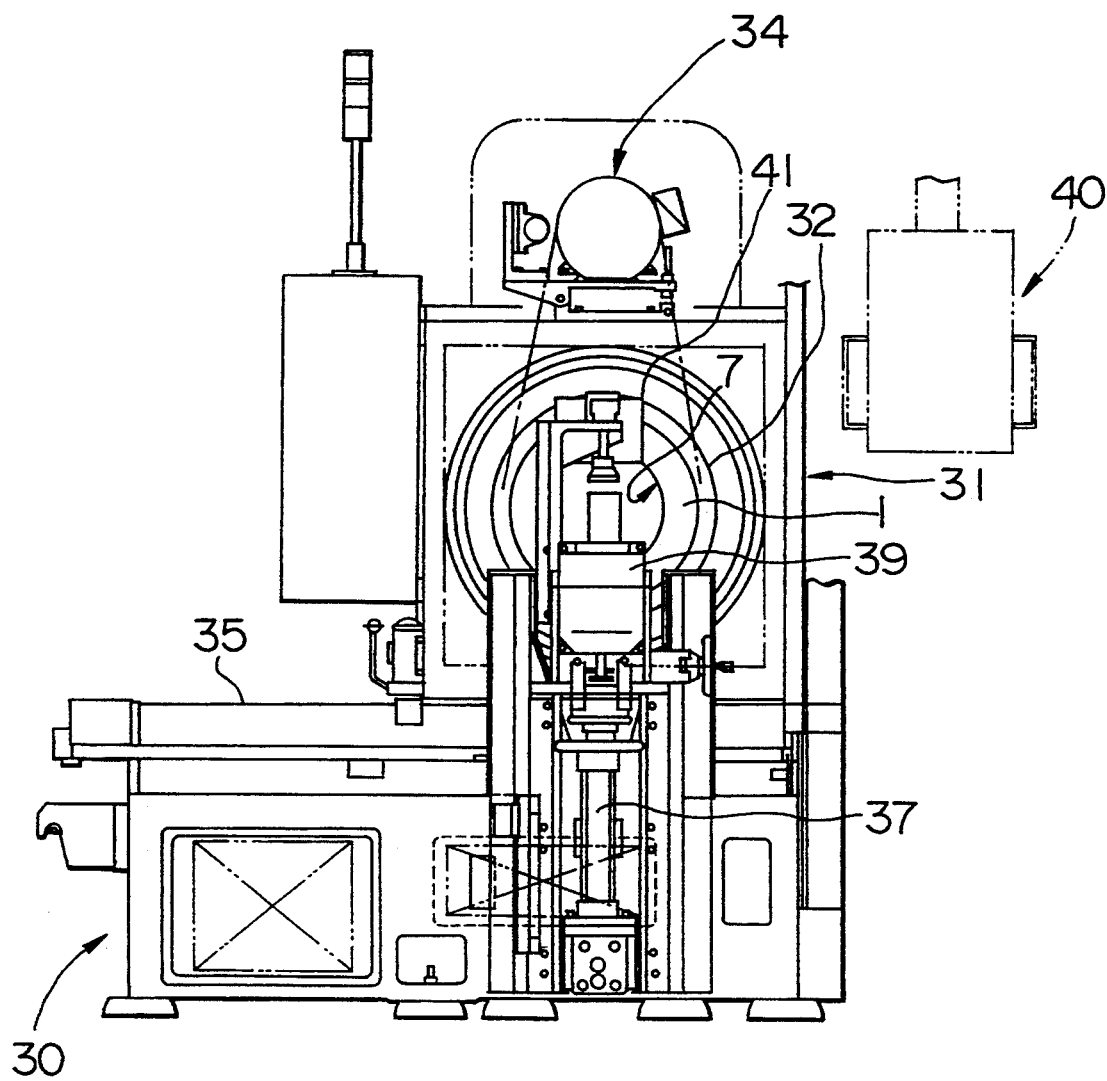
FIG. 7 is a front view of the slicing machine according to the second embodiment of the present invention.
Figure 8:
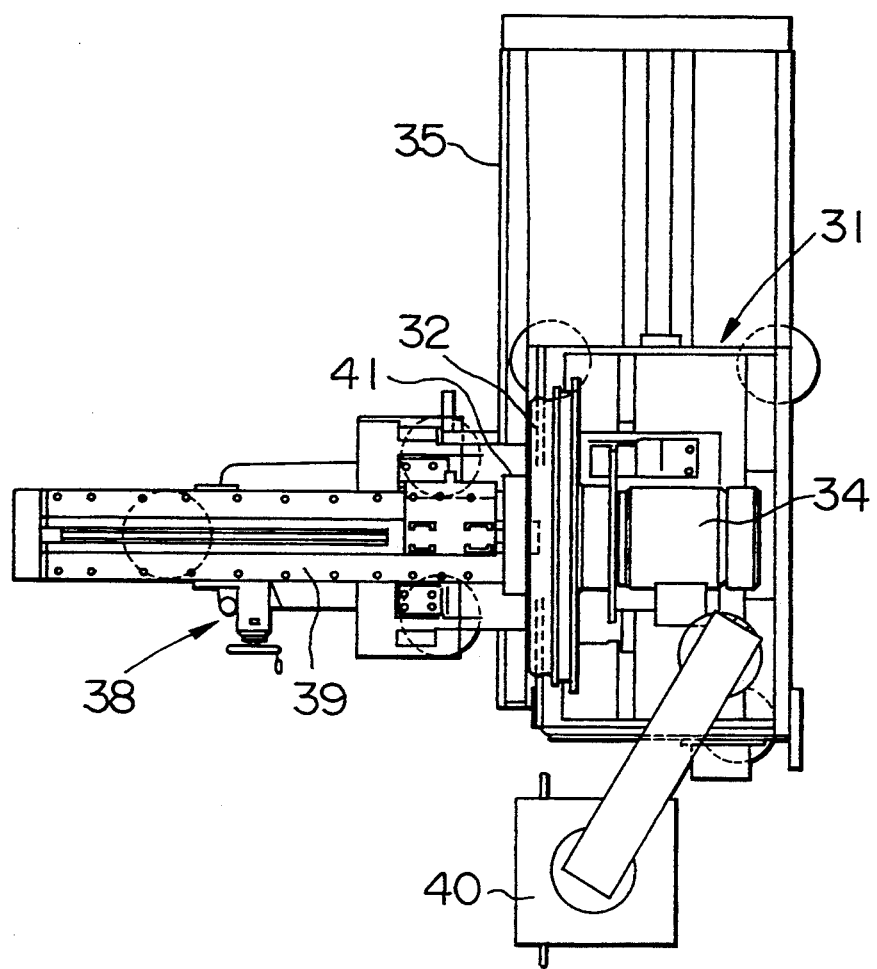
FIG. 8 is a plane view of the slicing machine according to the second embodiment of the present invention.
Figure 9:
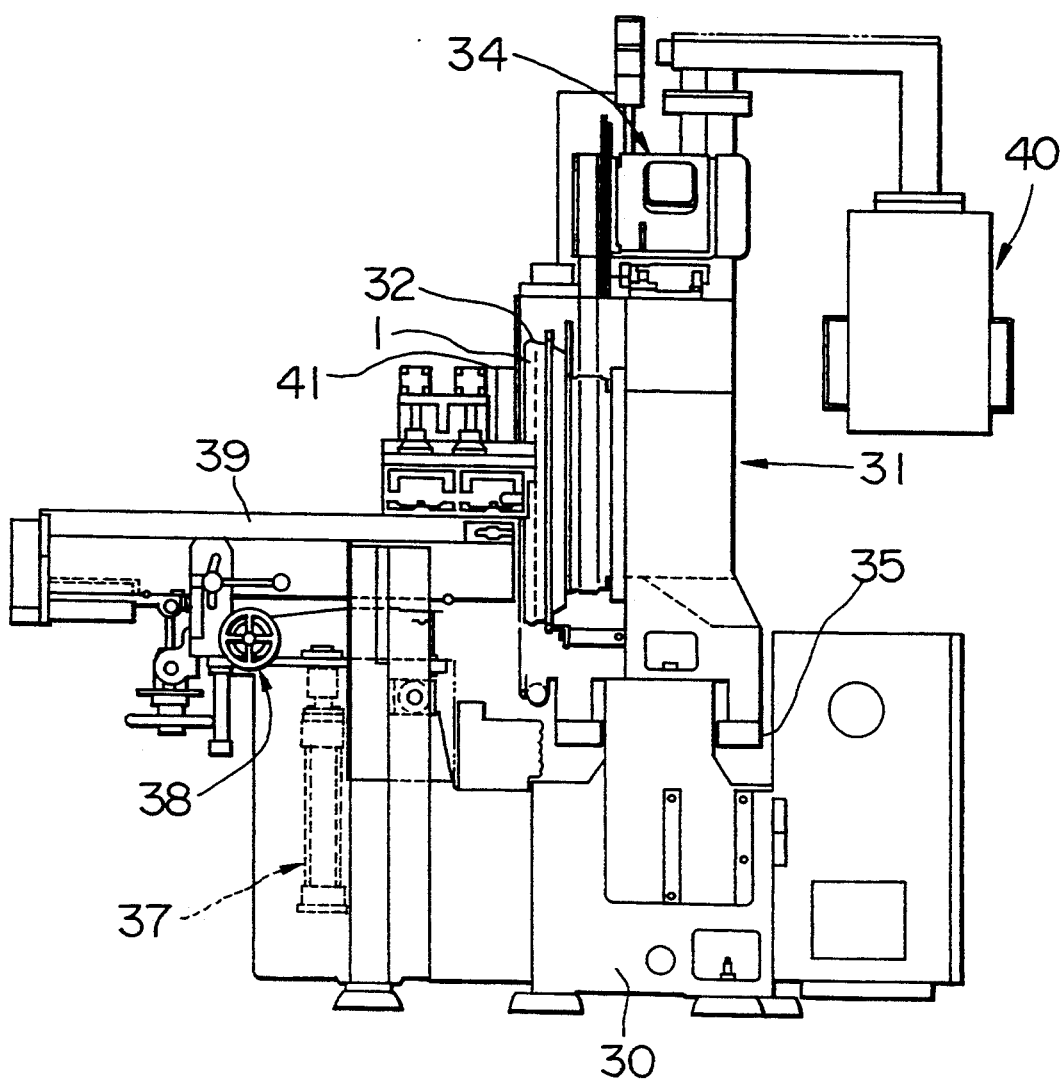
FIG. 9 is a side view of the slicing machine according to the second embodiment of the present invention.

Next, the second embodiment of the present invention will be explained. FIGS. 7, 8 and 9 are respectively a front view, a plan view and a side view of the present embodiment. The overall configuration shown in these figures is also common to the first embodiment.

In the present embodiment, a pair of rails 35 are fixed on a machine base 30 along the right and left direction in FIG. 7, and a column 31 is installed on the rails 35 movable along the rails. Inside the column 31, a blade support jig 32 is arranged coaxially with the column 31 in a rotatable way around a central axis thereof. The cutting blade 1 is coaxially fixed in the blade support jig 32 and is uniformly tensioned at the outer periphery thereof. A blade rotating means 34 is installed on the column 31, which rotates the blade support jig 32.

In front of the column 31, a work bed 39 is arranged in the direction of the central axis of the blade 1. This work bed 39 is installed on an elevating unit 37 such as a hydraulic actuator, for elevating the work bed 39 in order to slice the workpiece by the blade 1. A feed unit (not shown) is provided inside the work bed 39, for feeding the workpiece into the opening of the blade 1. Also, an angle adjustment device 38 is disposed under the work bed 39, for adjusting the angle of the work bed 39. A control unit 40 is provided for controlling each device of the slicing machine. Instead of the elevating unit 37 for the work bed 39, it is possible to provide an elevating means for the blade support jig 32.

Figure 10:
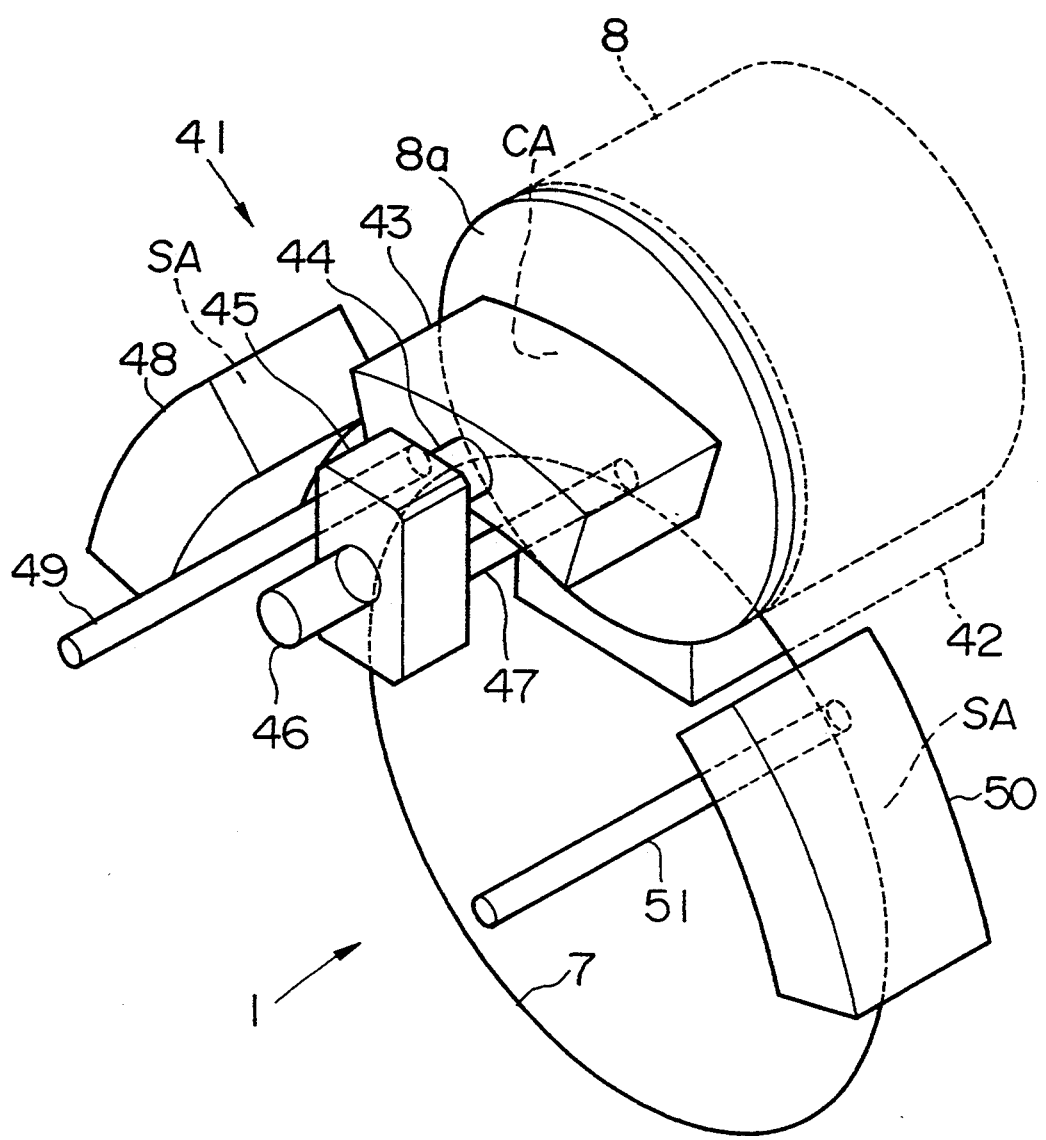
FIG. 10 is a schematic view showing the magnetic force generating means and the blade-position detecting means of the second embodiment.
Figure 11:
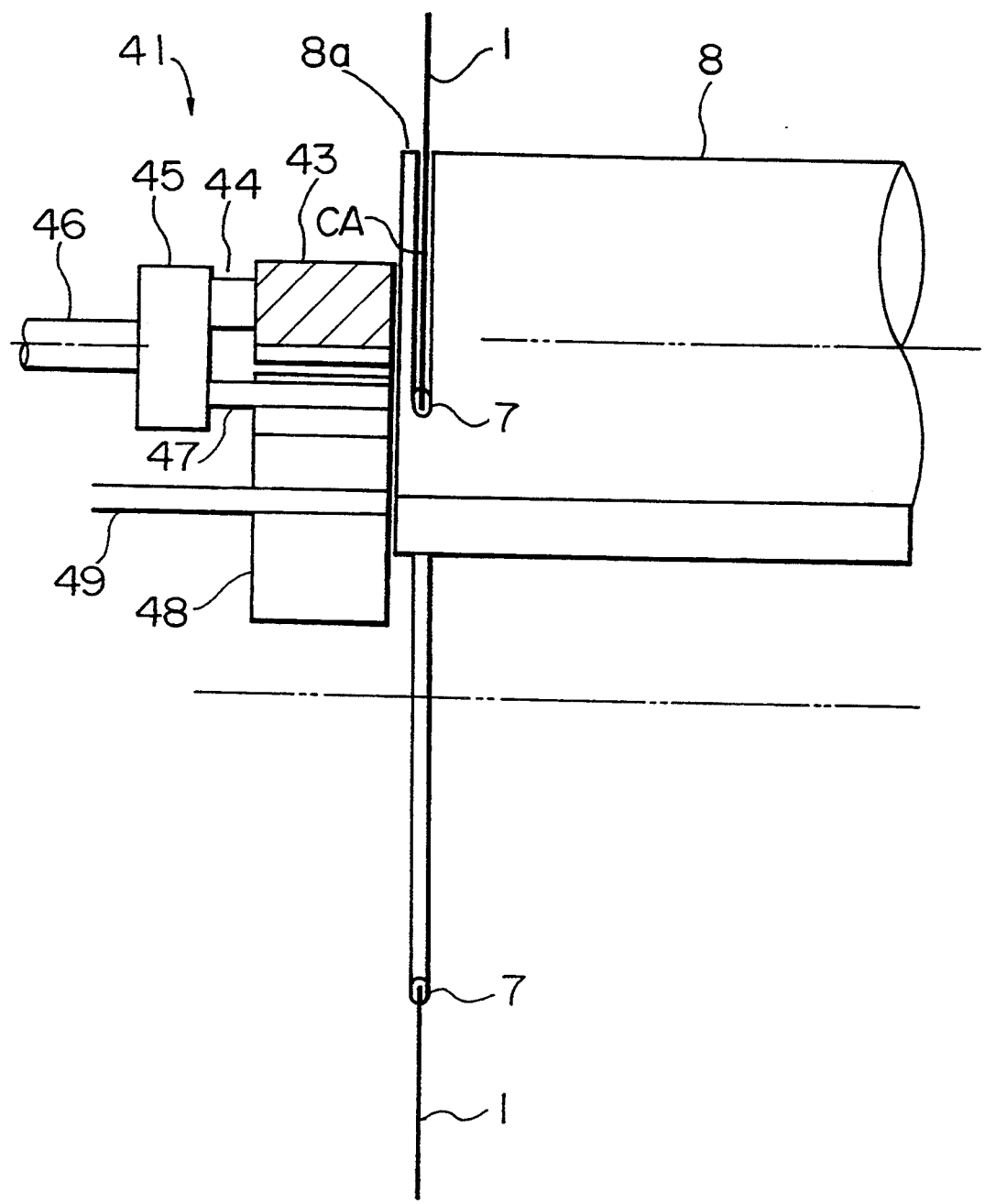
FIG. 11 is a side view showing the same portion as FIG. 10.
Figure 12:
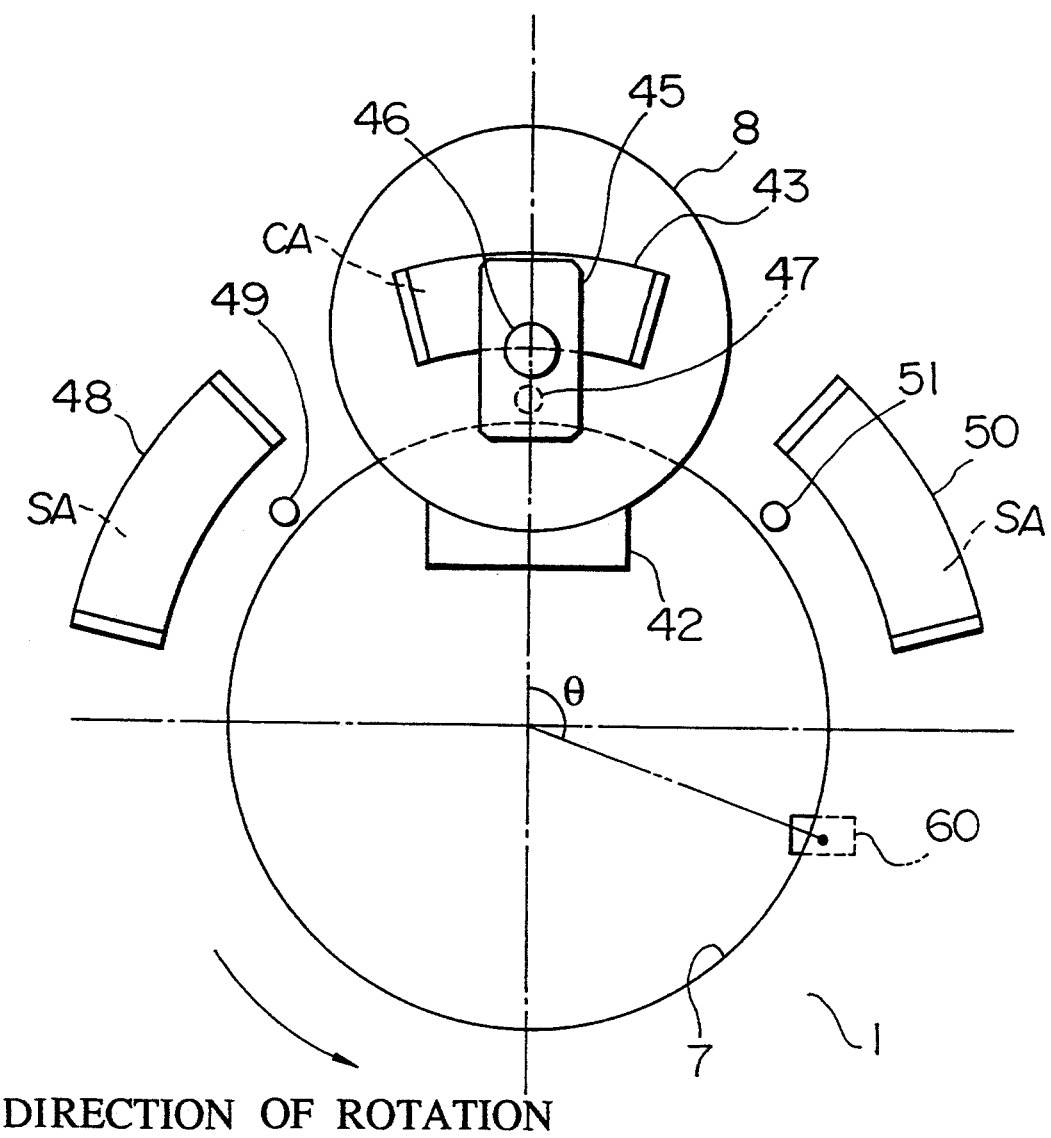
FIG. 12 is a front view showing the same portion as FIG. 10.

In the present embodiment, a blade-position control unit 41 is arranged in front of upper part of the blade 1, and is fixed to the column 31 via a support (not shown). FIGS. 10-12 show the details of the control unit 41. The workpiece 8 is fixed on a support 42, and the support 42 is placed on the work bed 39.

In front of the cutting area CA of the blade 1, a center electromagnet 43 (center magnetic force generating means) is arranged so that the partially cut slice 8a can be disposed between the center electromagnet 43 and the cutting area CA of the blade 1 during the slicing operation. The center electromagnet 43 and the blade 1 are positioned in parallel and symmetrically, and the center electromagnet 43 is fixed to a support 45 via a rod 44.

Below the center electromagnet 43, a center sensor (center blade-position detecting means) 47 is arranged parallel to the central axis of the blade 1, so that the partially cut slice 8a can be disposed between the center sensor 43 and the cutting area CA of the blade 1 during the slicing operation. The center sensor 47 is also fixed to the support 45, and the support 45 is installed to an actuating device (not shown) via a rod 46, which moves the support 45 towards the direction along the central axis of the blade 1. By means of the actuating device, the center electromagnet 43 and the center sensor 47 can be moved away from the slice 8a should the risk of interference between them arise.

At both sides of the center electromagnet 43, left and right electromagnets 48 and 50 are arranged symmetrically. The electromagnets 48 and 50 respectively oppose the side adjacent areas of the blade 1, which are located outside the workpiece 8 and adjacent to the cutting area CA in the circumferential direction of the blade 1.

Left and right sensors 49 and 51 are respectively arranged between each of the left and right electromagnets 48 and 50 and the cutting edge 7 of the blade, and the sensors 47, 49 and 51 are located in a symmetrical relationship. These sensors 47, 49 and 51 are, for example, eddy current sensors or the like as described in the explanation of the first embodiment.

The electromagnets 43, 48 and 50 are arc-shaped, having a center point coinciding with the central axis of the blade 1, and the distances from each of the electromagnets 43, 48 and 50 to the central axis of the blade 1 are identical. Also, the distances from each of the sensors 47, 49 and 51 to the central axis of the blade 1 are identical and smaller than the distance between the electromagnets 43, 48 and 50 and the central axis of the blade 1.

It is unavoidable that a remnant magnetism is acquired by the portion of the blade at which the magnetic force is applied. Therefore, if the magnetically attracted portion of the blade 1 runs in front of the sensors, the risk arises that a magnetic disturbance will be imparted on the function of the sensor. Accordingly, it is desirable to keep the sensors 47, 49 and 51 separate from the electromagnets 43, 48 and 50 by a constant distance in the radial direction of the blade 1, in order to avoid magnetic disturbances. Instead of the above-mentioned configuration, it is also possible to arrange the sensors 47, 49 and 51 on the non-cutting edge side of the electromagnets 43, 48 and 50.

Figure 13:
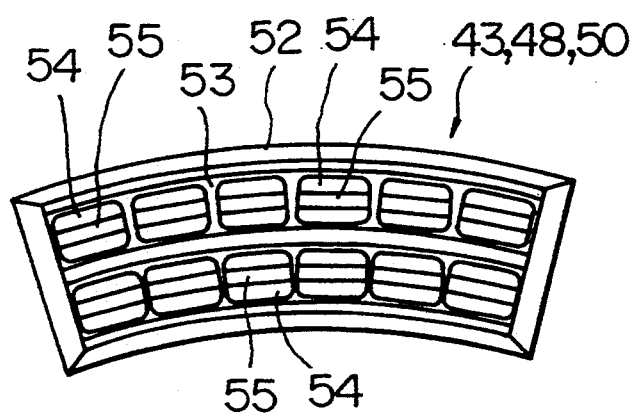
FIG. 13 is a rear view of the electromagnets of the second embodiment.
Figure 14:
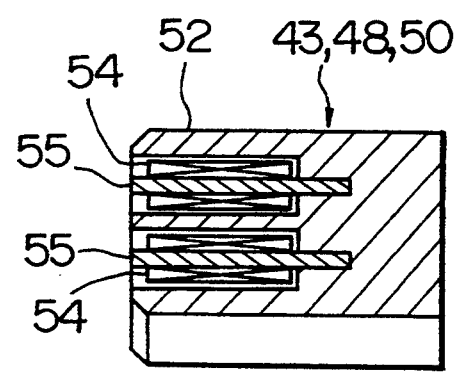
FIG. 14 is a cross section of the electromagnets of the second embodiment.
Figure 15:
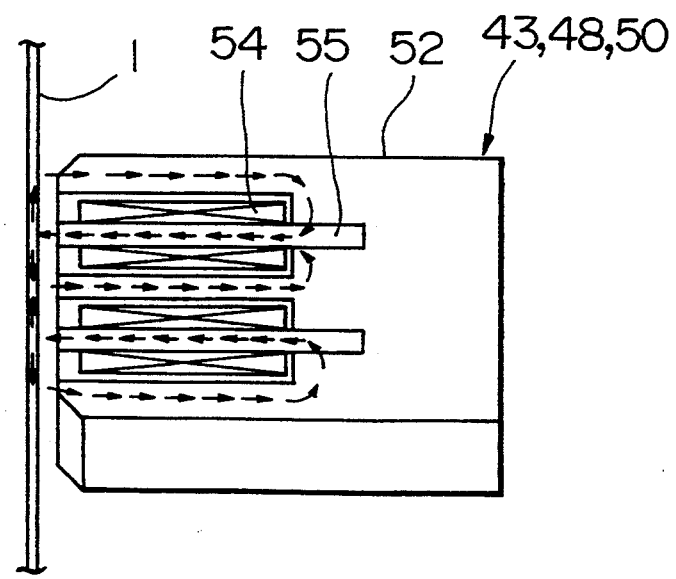
FIG. 15 is a cross section showing the effect of the electromagnets.

Each of the electromagnets 43, 48 and 50 comprises, as shown in FIGS. 13-15, a housing 52 made of a soft magnetic material such as pure iron. A pair of hollows 53 are formed in parallel in the head face of the housing 52, and a plurality (in this case, six) of cores 55 on which coils are wound up are installed inside each of the hollows 53. The cores 55 are made of the soft magnetic material, and all the coils 54 are connected to a current supply means (not shown) in order to magnetize all the cores 55 in the same phase.

The electromagnets 43, 48 and 50 can form closed magnetic circles, as shown in FIG. 15, which pass through the core 55, the corresponding portion of the blade 1, and the housing 52. Therefore, the leakage flux around the attracted portion of the blade 1 can be decreased, and the risk of magnetic disturbance can be decreased even if the distance between the sensors and the electromagnets is relatively small.

Next, the method of the blade-position control in the present embodiment will be explained. The following control is basically identical to the control shown in FIG. 6, and is preferably performed after starting the rotation of the blade 1. The magnetic forces to be generated by the left, center and right electromagnet 48, 43 and 50 are defined as $f_1$, $f_2$ and $f_3$ respectively, and the vector consisting of these magnetic forces $f_1$, $f_2$ and $f_3$ is defined as a vector F. Also, the deviations of the blade 1 which are measured by the left, center and right sensors 49, 47 and 51 are defined as $x_1$, $x_2$ and $x_3$, and the vector of these deviations is defined as a vector X as shown in the following formulas.

$$F = \begin{pmatrix} f_1 \\ f_2 \\ f_3 \end{pmatrix} \quad X = \begin{pmatrix} x_1 \\ x_2 \\ x_3 \end{pmatrix}$$

The relation between the vector F of the magnetic forces and the vector X of the deviations is represented by the following formula. In the following formula, the matrix C is a compliance matrix, and each of its elements $c_{ij}$ is a deviation of a position "i" (i:1, 2 or 3) of the blade which occurs when an electromagnet "j" (j:1, 2 or 3) generates magnetic force of a strength of "1". In this case, the positions 1, 2 and 3 indicate the positions corresponding to the sensors 49, 47 and 51, and the electromagnets 1, 2 and 3 indicate electromagnets 48, 43 and 50 respectively.

$$X = C * F \quad C = \begin{pmatrix} c_{11} & c_{12} & c_{13} \\ c_{21} & c_{22} & c_{23} \\ c_{31} & c_{32} & c_{33} \end{pmatrix}$$

By means of defining the inverse matrix $C^{-1}$ of the compliance matrix c as a stiffness matrix k, the following formula is acquired.

$$F = K \cdot X$$

The compliance matrix C can be easily obtained by carrying out an appropriate experience on the actual slicing machine, therefore, the stiffness matrix K (=the inverse matrix $C^{-1}$) also can be calculated by using the obtained compliance matrix C. In the present invention, the magnetic force to be generated by each of the electromagnets 43, 48 and 50 are calculated using the stiffness matrix K, and the control of the blade-position is performed.

Figure 16:
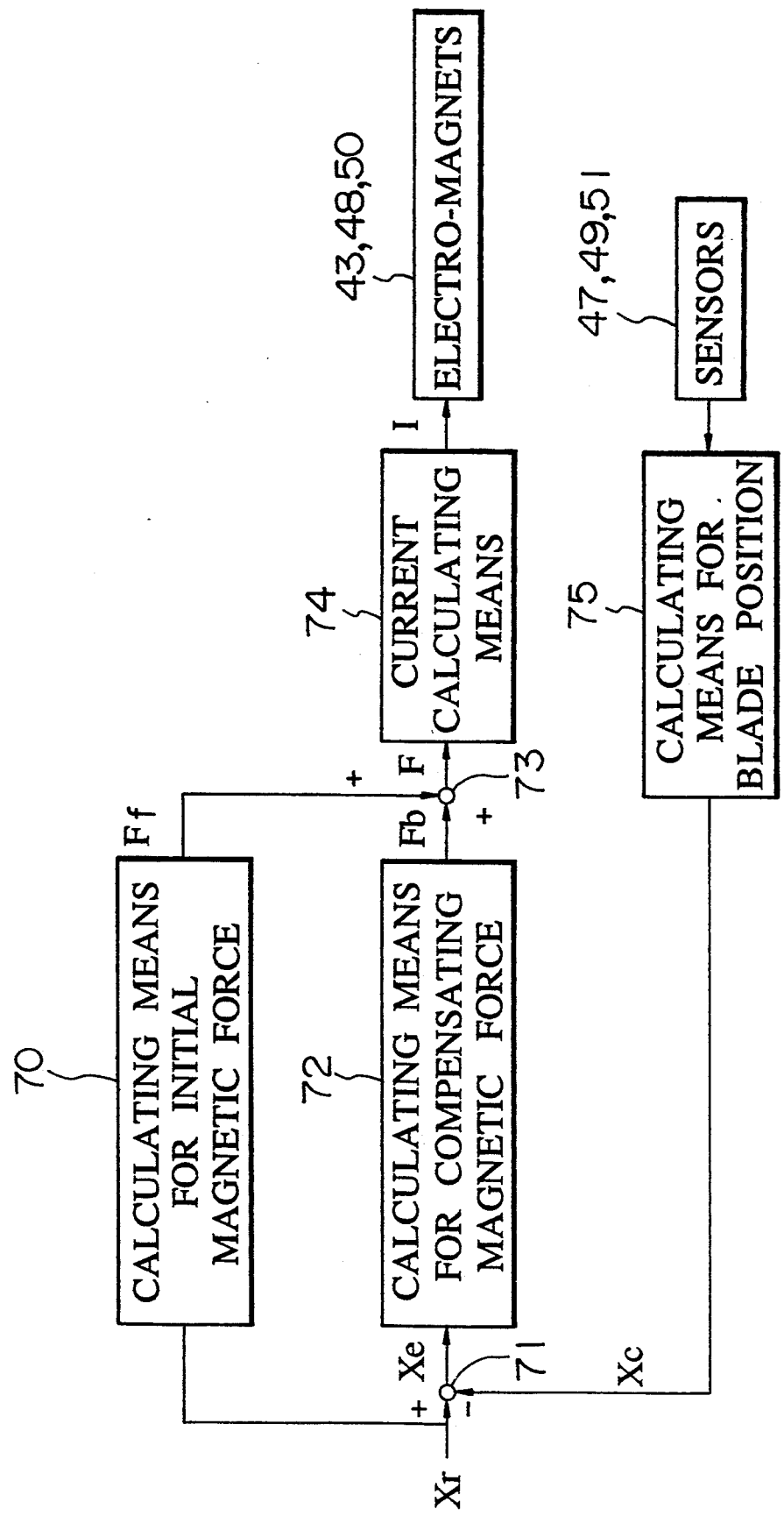
FIG. 16 is a block diagram of the control system of the second embodiment.

FIG. 16 is a block diagram showing the control system of the present embodiment. $X_r$ is a vector of the desired deviations (initial deviation) of the blade 1, and $x_{r1}$, $x_{r2}$ and $x_{r3}$ are the desired deviations of the positions of the blade 1 which correspond to the left, center and right sensors 49, 47 and 51.

$$X_r = \begin{pmatrix} x_{r1} \\ x_{r2} \\ x_{r3} \end{pmatrix}$$

In the present embodiment, after the blade 1 has begun rotating, a vector $F_f$ of the initial magnetic forces to be generated by the electromagnets 48, 43 and 50 are calculated by the initial magnetic force calculating means 70 from the input vector $X_r$, using the stiffness matrix K. The vector $F_f$ is represented by the following formula, and $f_{f1}$, $f_{f2}$ and $f_{f3}$ are the initial magnetic forces to be generated by the electromagnets 48, 43 and 50 respectively.

$$F_f = \begin{pmatrix} f_{f1} \\ f_{f2} \\ f_{f3} \end{pmatrix} = K \cdot X_r$$

The calculated vector $F_f$ of the initial magnetic force is transmitted to a current calculating means 74 via a total magnetic force calculating means 73. The current calculating means 74 calculates a vector I of the currents to be supplied to the electromagnets 48, 43 and 50 from the vector $F_f$ of the initial magnetic forces. In the following formula, $i_1$, $i_2$ and $i_3$ are the currents to be supplied to the electromagnets 43, 48 and 50 respectively.

$$I = \begin{pmatrix} i_1 \\ i_2 \\ i_3 \end{pmatrix}$$

In order to calculate the currents $i_1$, $i_2$ and $i_3$ from the initial magnetic force $f_{f1}$, $f_{f2}$ and $f_{f3}$, it is necessary to obtain a function between them beforehand by performing an appropriate examination. The currents $i_1$, $i_2$ and $i_3$ can be easily calculated using such a function, and by means of supplying the calculated currents $i_1$, $i_2$ and $i_3$ to each of the electromagnets 48, 43 and 50, the deviations of the side adjacent areas SA and the cutting area CA of the blade 1 correspond to the desired initial deviations $x_{r1}$, $x_{r2}$ and $x_{r3}$.

After adjusting the deviations of the blade 1, the workpiece 8 is positioned at a slicing position inside the opening of the blade 1 by means of the elevating unit 37 and the feed unit 38, and the slicing process is begun.

During the slicing, the sensors 49, 47 and 51 measure the actual positions of the corresponding areas SA and CA respectively, the output signals of the sensors 49, 47 and 51 are transmitted to the blade-position calculating means 75, and the blade-position calculating means 75 calculates the actual deviations $x_{c1}$, $x_{c2}$ and $x_{c3}$ of the measuring points of the blade 1. In the following formula, $X_c$ is defined as a vector consisting of the actual deviations $x_{c1}$, $x_{c2}$ and $x_{c3}$ which are derived from the sensors 49, 47 and 51 respectively.

$$X_c = \begin{pmatrix} x_{c1} \\ x_{c2} \\ x_{c3} \end{pmatrix}$$

The vector $X_c$ of actual deviations is transmitted to a difference calculating means 71, and the difference calculating means 71 calculates the differential vector $X_e$ between the vector $X_c$ and the vector $X_r$.

$$X_e = X_r - X_c = \begin{pmatrix} x_{r1} - x_{c1} \\ x_{r2} - x_{c2} \\ x_{r3} - x_{c3} \end{pmatrix}$$

The differential vector $X_e$ is transmitted to a compensating calculating means 72, and the compensating calculating means 72 calculates the vector $F_b$ of the compensating magnetic force. The following formula is one of control laws which can be used in the present invention, it is possible to zero the differential vector $X_c$ by using such a formula. The elements $f_{b1}$, $f_{b2}$ and $f_{b3}$ of the vector $F_b$ represent compensating magnetic forces for compensating the initial magnetic forces $f_{f1}$, $f_{f2}$ and $f_{f3}$ respectively.

$$F_b = \begin{pmatrix} f_{b1} \\ f_{b2} \\ f_{b3} \end{pmatrix} = k_p \cdot K \cdot X_e$$

Instead of the above-mentioned formula, many modified formula can be used as the control law in the present invention, for example, as follows.

$$F_b = k_p \cdot K \cdot X_e + k_i \cdot K \int_0^t X_e \, dt$$

The vector $F_b$ of the compensating magnetic forces is transmitted to the total magnetic force calculating means 73, and the means 73 calculates the vector F of the magnetic forces to be generated by the electromagnets 48, 43 and 50, by means of adding the vector $F_b$ of the initial magnetic forces and the vector $F_f$ of the compensating magnetic forces. The calculated vector F is transmitted to the current calculating means 74, and the current vector I is calculated by the current calculating means 74 using the above-mentioned function. Furthermore, the calculated currents $i_1$, $i_2$ and $i_3$ are supplied to each of the electromagnets 48, 43 and 50, thus, the deviations of the side adjacent areas SA and the cutting area CA of the blade 1 can be adjusted to the desired deviations $x_{r1}$, $x_{r2}$ and $x_{r3}$ again. By means of repeating the above-mentioned control cycle process continuously during the slicing of the workpiece 8, the cutting edge 7 of blade 1 can be accurately positioned at the desired positions in the workpiece.

The magnetic forces applied to the blade from each electromagnet may vary according to the change in the distance between them. However, the changes in the distances between the blade and the electromagnets are, in general, in the range of several microns, and are much smaller than the distance between the blade and the electromagnet, which is, in general, about 1 mm. Therefore, it is not necessary to compensate the magnetic forces in accordance with the change in the distances between the electromagnets and the blade 1.

According to the slicing machine of the present embodiment, by means of inputting the vector $X_r$ of the desired deviation to the control means, it is possible to accurately adjust the deviations of the three areas SA and CA of the blade 1, which oppose the sensors 49, 47 and 51, to the desired deviations $x_{r1}$, $x_{r2}$ and $x_{r3}$ during the whole slicing operation. Therefore, wafers having an desired flatness can be produced.

Also, in the slicing machine of the present embodiment, the center sensor 47 is located opposite the cutting area CA of the blade 1 and directly measures the actual deviation $x_{c2}$ of the cutting area CA, thus, it is possible to detect the actual deviation $x_{c2}$ corresponding to the cutting area CA. Therefore, in comparison with a conventional slicing machine which comprises two side blade-position sensors arranged at both sides of the partially cut slice, the flatness of the cutting plane can be extremely improved.

Instead of improving the flatness of the wafers, it is also possible, if necessary, in produce wafers having a desired warp or desired irregularities in flatness. For example, to give an appropriate warp to the wafers can balance a warp which will be generated in a heating process in a device manufacturing process. In order to produce a wafer having such an irregularity in flatness, it is sufficient to determine the desired deviations $x_{r1}$, $x_{r2}$ and $x_{r3}$ different from one another, or to vary the desired deviation $x_{r1}$, $x_{r2}$ and $x_{r3}$ as the slicing continues. The conventional slicing machines cannot produce wafers having such a predetermined irregularity in flatness.

Furthermore, in this embodiment, the electromagnets 48, 43 and 50 always attract the blade 1 to shift the areas SA and CA of the blade 1 to the desired positions (=initial positions), as shown in FIG. 6, during the slicing operation, therefore, the blade 1 can be shifted in both directions along the central axis of the blade 1 by means of decreasing or increasing the magnetic forces.

In the present embodiment, the currents to be supplied to the electromagnets 48, 43 and 50 are calculated using the stiffness matrix K, therefore, the stability of the blade control is high. In contrast, if each of the electromagnets is controlled according only to the output signal of each of the corresponding sensors, i.e., independent from one another, since the deviation applied to one point of the blade will cause an unnecessary deviation at another point of the blade, the stability of blade control will be decreased. Nevertheless, such independent control of the electromagnets is also possible in the present invention.

Furthermore, in the present embodiment, since the center electromagnet 43 and the center sensor 47 can be moved away by the actuating means from the blade 1, when the first slice of the new ingot is performed, the interference of these devices 43 and 47 and the end of the workpiece 8 is avoidable. Even if the center electromagnet 43 and the center sensor 47 are kept separate from the workpiece 8 and are not operational, the blade control will be possible by means of the side electromagnets 48, 50 and the side sensors 49 and 51, though the accuracy will be decreased.

In the present embodiment, the initial magnetic force calculating means 70 calculates the vector $F_f$ of the initial magnetic forces, and the vector $F_f$ is transmitted to the total magnetic force calculating means 73 for feedforward control. However, the initial magnetic force calculating means 70 is not indispensable in the present invention. Even if the initial magnetic calculating means 70 is not provided, the actual deviations $x_{c1}$, $x_{c2}$ and $x_{c3}$ of the blade 1 can be adjusted to the desired deviations $x_{r1}$, $x_{r2}$ and $x_{r3}$ by the compensating magnetic force calculating means 72. However, the feedforward by means of the initial magnetic force calculating means 70 can improve the responsibility of the blade-position control, in comparison with the case of where there is no feedforward.

Furthermore, although the present embodiment comprises three pairs of sensors and electromagnets, the number of sensors or electromagnets can be changed to 1, 2 or more than 4 respectively. The accuracy of the blade-position control can be increased according to the number of sensors and electromagnets. In the case where the number of electromagnets and the number of sensors is "N", similar matrix calculations can be easily performed using a compliance matrix C and a stiffness matrix K which has N rows and N columns.

On the other hand, if the number of electromagnets is different from the number of sensors, the "rank" of the compliance matrix C must be the same as or more than the number of sensors in order to control the blade with high accuracy. In the case where the number of electromagnets is more than the number of sensors, the compliance matrix does not become a square matrix. Therefore, it may not be possible to obtain a corresponding inverse matrix, i.e., the stiffness matrix K. However, in such a case, it is possible to calculate a pseudo-inverse matrix instead of the inverse matrix, and the blade-position control can be performed as well as in the above-mentioned embodiment by using the pseudo-Inverse matrix. In contrast, if the number of electromagnets is less than the number of sensors, it is not possible to adjust the actual deviations of all of the measuring areas of the blade to the desired deviations respectively.

Furthermore, in the embodiment shown in FIGS. 7–16, instead of always keeping the blade 1 at the initial position, the above-mentioned modification (i) can be adopted.

EXAMPLE

A slicing test was performed using the slicing machine shown in FIGS. 7–17. In this machine, the left sensor 49 and the right sensor 51 were positioned so that the central angles between each of them and the center sensor 47 was 50° respectively, and the distances between each of the sensors 47, 49 and 51 and the cutting edge 7 of the blade 1 in the radial direction of the blade 1 was determined to 10 mm. Also, the left and right electromagnets 48 and 50 were positioned so that the central angles between each of them and the center electromagnets 43 was 60°. Eddy current sensors were used as the sensors 47, 49 and 51, and the distances from each of the sensors to the corresponding electromagnet in the radial direction of the blade 1 were determined to be 12 mm in order to prevent magnetic disturbance to the eddy current sensors. The existence of the magnetic disturbance was examined by means of measuring the actual deviations of the blade 1 using a laser displacement gauge, and further comparing the data with the corresponding data measured by each of the eddy current sensors.

Figure 17:
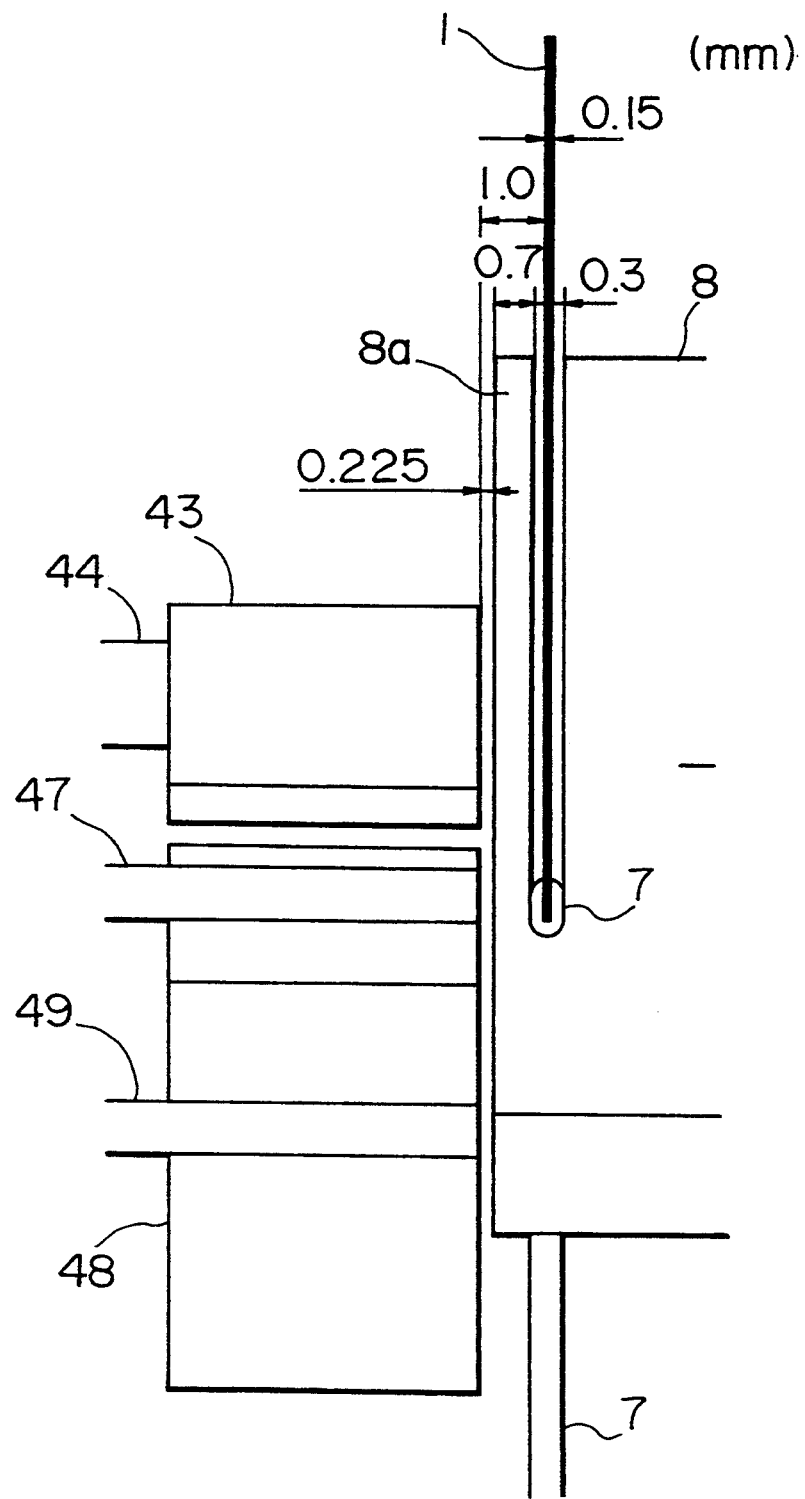
FIG. 17 is a side view showing the arrangement of the electromagnets, the sensors and the blade in the slicing machine of the present invention.

FIG. 17 shows the arrangement of the blade 1, the electromagnets 48, 43 and 50, and the sensors 49, 47 and 51. The blade 1 has: an inner diameter of 235 mm, a blade body thickness of 0.15 mm, and a cutting edge thickness of 0.30 mm. The blade body was made of a ferromagnetic stainless, and the cutting edge contained diamond grains embedded in a nickel matrix. The blade was tensioned by the blade supporting jig 32 so that the inner radius of the blade 1 was enlarged by 1.2 mm. In this condition, when the inner area of the blade 1 was pushed by the strength of 350 gf. in the direction perpendicular to the blade 1, the inner area shifted 50 micron.

As shown in FIGS. 13–15, each of the electromagnets 48, 43 and 50 comprise a housing 52, twelve cores 55 installed in the housing 52, and coils 54 which were wound around the cores 55 respectively. The housing 52 and the cores 55 are made of pure iron, and the number of turns of each coil 54 was 300.

Using this slicing machine, the relation between the magnetic strength generated by the electromagnet 43 and the displacement of the blade 1 was examined. As shown in FIG. 12, a laser displacement gauge 60 was arranged at a position where it was 10 mm outward from the cutting edge 7, and the central angle between the displacement gauge 60 and the center electromagnets 43 was changed every 10 degrees for each measurement. While rotating the blade 1 at a speed of 1460 r.p.m., a current of 1.5 ampere was supplied to the electromagnet 43, and the deviations of the blade 1, i.e., the variations in the blade-position between the on-off of the current, were measured.

Figure 18:
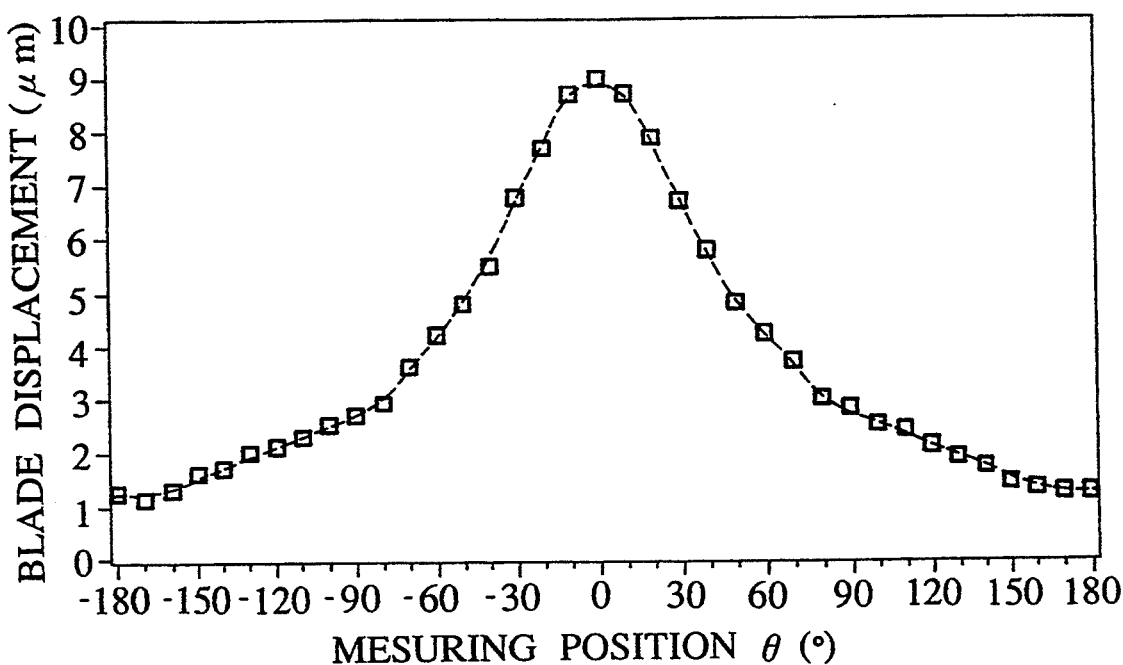
FIGS. 18 and 19 are graphs showing the relation between the measuring position and the blade displacement in the slicing machine when the magnetic force was generated.

The results of the experiment are shown in Table 1 and FIG. 18. The deviation became maximum at a position where the central angle was 0°, and became minimum at a position where the central angle was 180°. As shown in FIG. 18, the graph of the blade displacement was symmetrical irrespective of the rotational direction of the blade 1.

TABLE 1

| Angle (deg.) | −180 | −170 | −160 | −150 | −140 | −130 | −120 | −110 | −100 |
|---|---|---|---|---|---|---|---|---|---|
| Displacement (micron) | 1.2 | 1.1 | 1.3 | 1.6 | 1.7 | 2.0 | 2.1 | 2.3 | 2.5 |
| Angle (deg.) | −90 | −80 | −70 | −60 | −50 | −40 | −30 | −20 | −10 |
| Displacement (micron) | 2.7 | 2.9 | 3.6 | 4.2 | 4.8 | 5.5 | 6.8 | 7.7 | 8.7 |
| Angle (deg.) | 0 | 10 | 20 | 30 | 40 | 50 | 60 | 70 | 80 |
| Displacement (micron) | 9.0 | 8.7 | 7.9 | 6.7 | 5.8 | 4.8 | 4.2 | 3.7 | 3.0 |
| Angle (deg.) | 90 | 100 | 110 | 120 | 130 | 140 | 150 | 160 | 170 |
| Displacement (micron) | 2.8 | 2.5 | 2.4 | 2.1 | 1.9 | 1.7 | 1.4 | 1.3 | 1.2 |

Figure 19:
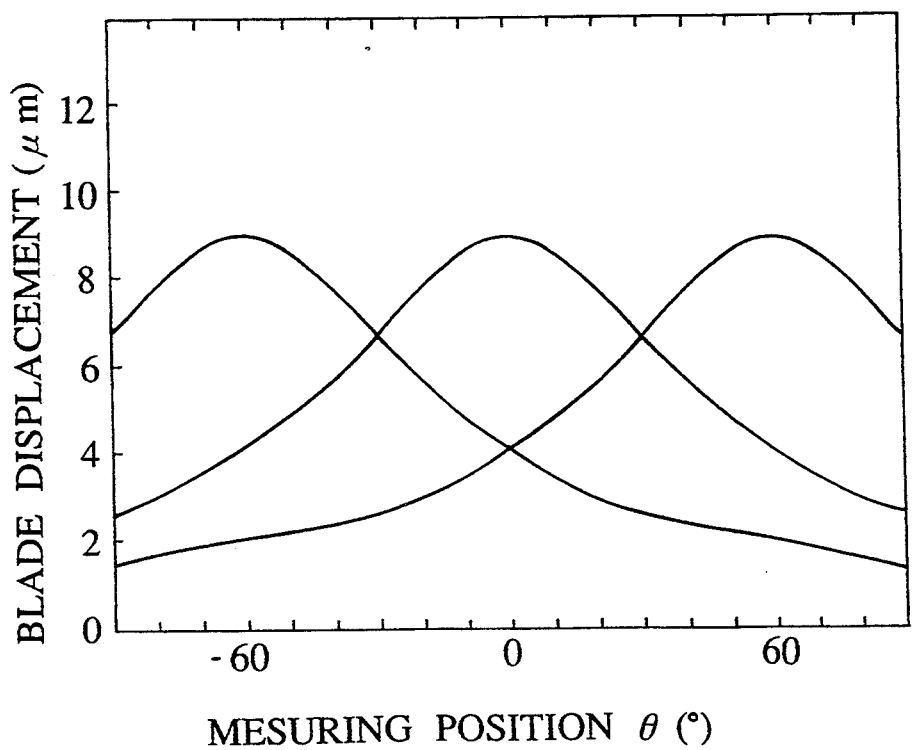

The left and right electromagnets 48 and 50 are the same as the center electromagnet 43, therefore, if a current of 1.5 ampere is supplied to each of the electromagnets 48 and 50, the graphs of the deviation of the blade 1 will be graphs having the same shape as shown by the left and right side lines in FIG. 19. By means of setting the magnetic force of each electromagnet to 1 when a current of 1.5 ampere was supplied to the electromagnet, the following compliance matrix C and stiffness matrix K were obtained from the data of Table 1 and FIG. 18.

$$C = \begin{pmatrix} 8.7 & 4.8 & 2.3 \\ 4.2 & 9.0 & 4.2 \\ 2.3 & 4.8 & 8.7 \end{pmatrix}$$

$$K = C^{-1} = \begin{pmatrix} 0.1548 & -0.0818 & -0.0014 \\ -0.0716 & 0.1875 & -0.0716 \\ -0.0014 & -0.0818 & 0.1548 \end{pmatrix}$$

Figure 20:
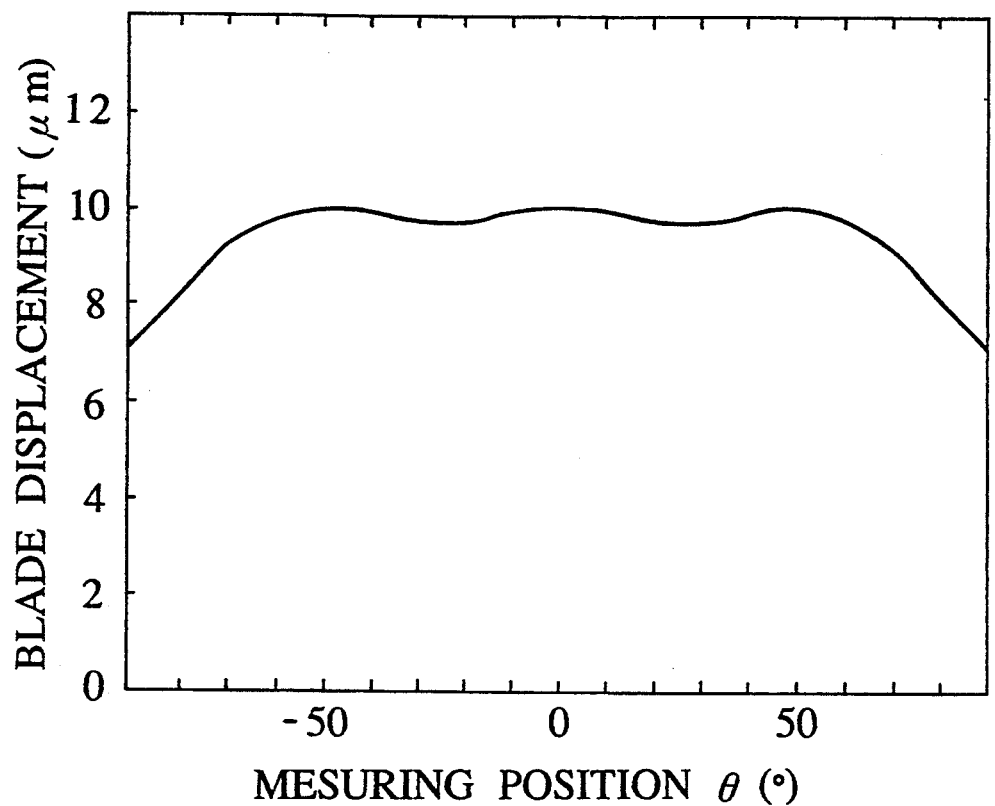
FIGS. 20, 21 and 22 are graphs showing the shapes of the cutting planes obtained with the slicing machine.
Figure 21:
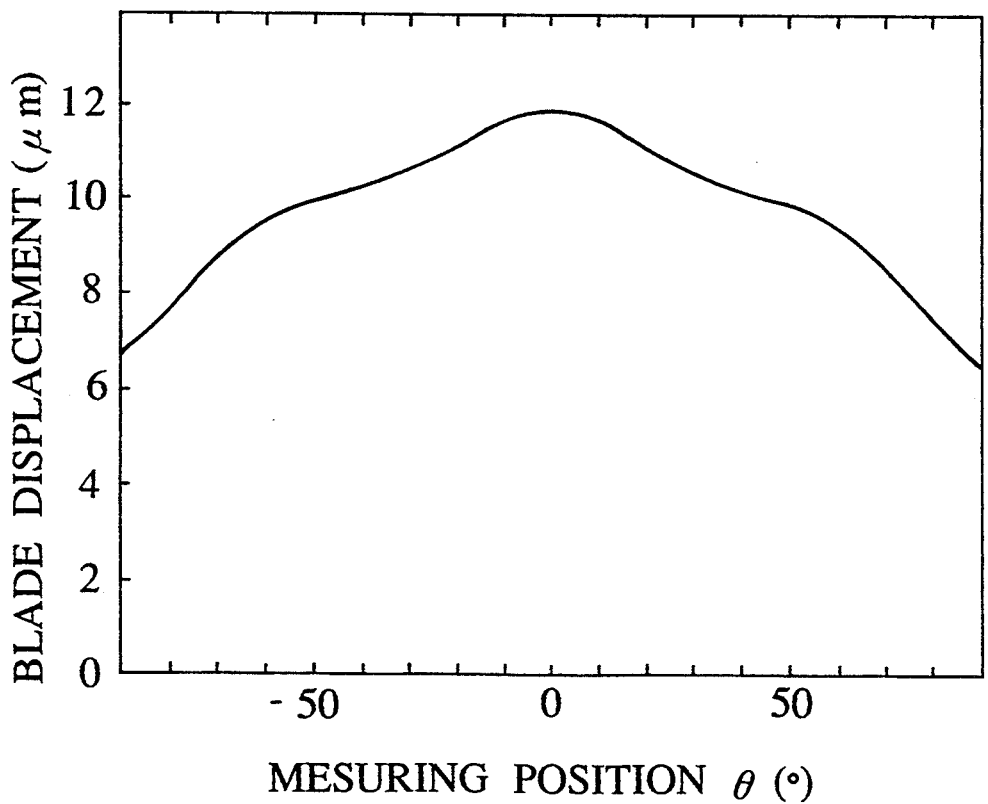
Figure 22:
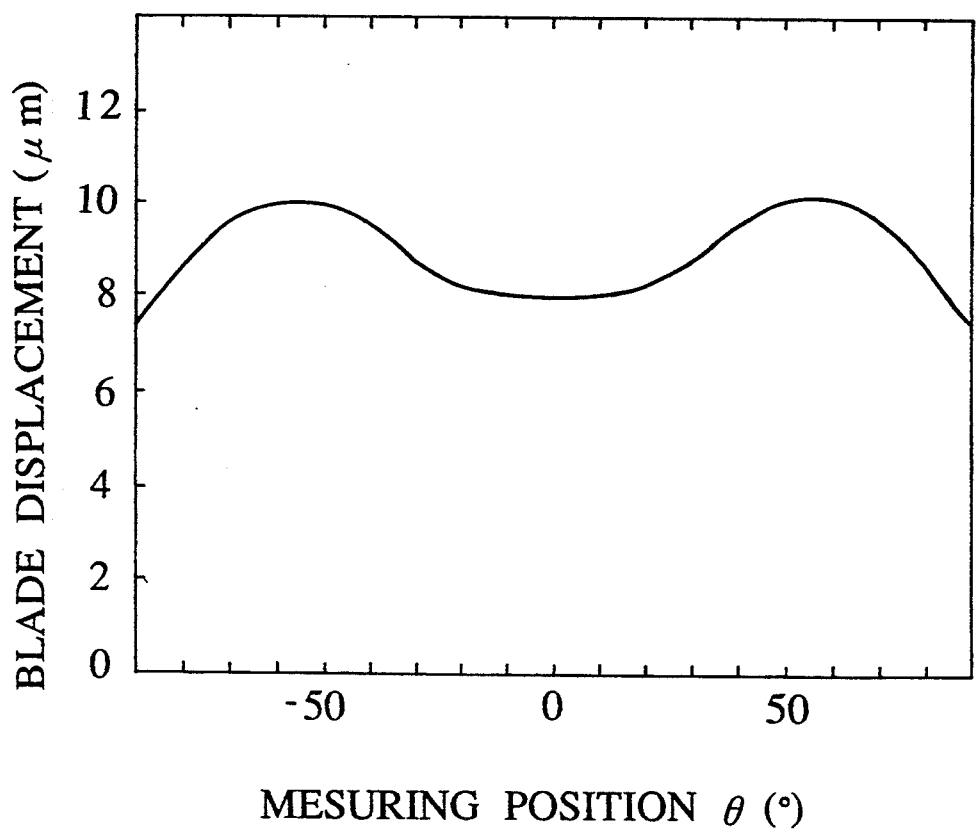

Table 2 shows three examples of the desired deviations $x_1$, $x_2$ and $x_3$ and the calculated magnetic forces $f_1$, $f_2$ and $f_3$ to be generated by the electromagnets 48, 43 and 50 in accordance with the desired deviations respectively. Furthermore, the currents $i_1$, $i_2$ and $i_3$ to be supplied to the electromagnets 48, 43 and 50 were calculated in accordance with the magnetic forces $f_1$, $f_2$ and $f_3$. After stopping the compensating magnetic force calculating means 72, the currents $i_1$, $i_2$ and $i_3$ were supplied to the electromagnets 48, 43 and 50, and the actual deviations $x_{c1}$, $x_{c2}$ and $x_{c3}$ of the blade were measured by the laser displacement gauge 60. As a result, it was confirmed that the actual deviations of the blade agreed with the desired deviations. FIGS. 20, 21 and 22 show the expected shapes of the cutting plane of the workpiece which were calculated using the compliance matrix C, corresponding to the three cases of flat, convex, and concave as shown below.

TABLE 2

| Shape of cutting plane | $x_1$ | $x_2$ | $x_3$ | $f_1$ | $f_2$ | $f_3$ |
|---|---|---|---|---|---|---|
| Flat (FIG. 20) | 10 | 10 | 10 | 0.716 | 0.443 | 0.716 |
| Convex (FIG. 21) | 10 | 12 | 10 | 0.552 | 0.818 | 0.552 |
| Concave (FIG. 22) | 10 | 8 | 10 | 0.880 | 0.068 | 0.880 |

What is claimed is:

1. A slicing machine for cutting a workpiece into slices, comprising:

(a) a circular-shaped internal rotary blade made of a ferromagnetic material, having an opening in a center thereof, and having a cutting edge at an inner peripheral margin thereof;

(b) blade rotating means for maintaining tension in said blade and for rotating said blade around a central axis thereof;

(c) work supporting means for supporting said workpiece and for positioning said workpiece inside said opening of said blade;

(d) moving means for moving at least one of said work supporting means and said blade rotating means to slice said workpiece by said blade;

(e) center blade-position detecting means for generating a signal in response to an amount of displacement, from an initial position, of a cutting area of said blade to be inserted in said workpiece, wherein said center blade-position detecting means is arranged opposite said cutting area of said blade so that a partially cut slice of said workpiece is disposed between said center blade-position detecting means and said cutting area of said blade during a cutting operation of said workpiece;

(f) center magnetic force generating means arranged opposite said cutting are of said blade, for generating a magnetic force to effectuate a displacement of said cutting area of said blade, said center magnetic force generating means being controllable to vary a magnitude of said magnetic force applied to said blade and thus an amount of deformation of said cutting area from said initial position, for generating an initial magnetic force to effectuate an initial deformation of said cutting area of said blade and to position said cutting area in said initial position prior to said cutting operation, wherein said partially cut slice is disposed between said center magnetic force generating means and said cutting area of said blade during said cutting operation; and (g) controlling means for controlling said magnetic force generated by said center magnetic force generating means to control said amount of displacement of said cutting area from said initial position, said controlling means being responsive to said signal generated by said center blade-position detecting means to increase said deformation of said blade relative to said initial deformation and thereby magnetically bias said cutting area in a first direction with respect to said initial position of said cutting area when said cutting area is displaced in a second direction opposite said first direction as a result of said cutting operation, said controlling means decreasing said magnetic force generated by said center magnetic force generating means to reduce said deformation of said cutting area relative to said initial deformation and thereby permit said cutting area to move in said second direction opposite said first direction when said cutting edge is displaced in said first direction as a result of said cutting operation.

2. A slicing machine according to claim 1, wherein said center magnetic force generating means comprises at least one electromagnet which is arranged opposite said cutting area of said blade with said partially cut slice disposed between said at least one electromagnet and said cutting area of said blade during said cutting operation.

3. A slicing machine according to claim 2, wherein said controlling means shifts said cutting area of said blade from a free position thereof, towards said center magnetic force generating means, to a predetermined initial position, by supplying an initial current to said at least one electromagnet before beginning said cutting operation, and adjusts said initial current in accordance with said signals generated by said center blade-position detecting means during said cutting operation.

4. A slicing machine for cutting a workpiece into slices, comprising:

(a) a circular-shaped internal rotary blade made of a ferromagnetic material, having an opening in a center thereof, and having a cutting edge at an inner peripheral margin thereof;

(b) blade rotating means for maintaining tension in said blade and for rotating said blade around a central axis thereof;

(c) work supporting means for supporting said workpiece and positioning said workpiece inside said opening of said blade;

(d) moving means for moving at least one of said work supporting means and said blade rotating means to slice said workpiece by said blade;

(e) center blade-position detecting means for generating a signal in response to an amount of a displacement of a cutting area of said blade to be inserted in said workpiece, wherein said center blade-position detecting means is arranged opposite said cutting area of said blade so that a partially cut slice of said workpiece is disposed between said center blade-position detecting means and said cutting area of said blade during a cutting operation of said workpiece;

(f) center magnetic force generating means for attracting said cutting area of said blade by generating magnetic force, wherein said center magnetic force generating means is arranged. opposite said cutting area of said blade with said partially cut slice disposed between said center magnetic force generating means and said cutting area of said blade during said cutting operation;

(g) controlling means for controlling said magnetic force generated by said center magnetic force generating means in accordance with an output signal from said center blade-position detecting means;

(h) at least one side magnetic force generating means for attracting adjacent side areas of said cutting area of said blade by generating magnetic force, wherein each of said side magnetic force generating means are disposed apart from said center magnetic force generating means along a circumferential direction of said blade, and are opposed to each of said adjacent side areas of said blade;

(i) at least one side blade-position detecting means for measuring displacements of said adjacent side areas towards a direction of said central axis of said blade, wherein each of said side blade-position detecting means are disposed apart from said center blade-position detecting means along a circumferential direction of said blade, and are opposed to said adjacent side area of said blade; and (j) controlling means for controlling said magnetic force generated by each of said center magnetic force generating means and said side magnetic force generating means in accordance with output signals from said center magnetic force generating means and said side blade-position detecting means.

5. A slicing machine according to claim 4, wherein each of said center magnetic force generating means and said side magnetic force generating means comprises at least one electromagnet for attracting said blade.

6. A slicing machine according to claim 5, wherein said controlling means comprises:

initial magnetic force calculating means for calculating each initial magnetic force to be generated by each of said electromagnets of said center magnetic force generating means and said side magnetic force generating means, to respectively shift said cutting area and adjacent areas of said blade to predetermined desired positions;

deviation calculating means for calculating deviations of actual positions from said desired positions of said cutting area and adjacent side areas of said blade;

compensating magnetic force calculating means for calculating each compensating magnetic force to be added to said initial magnetic force of each of said electromagnets in accordance with said deviations;

total magnetic force calculating means for respectively calculating a total magnetic force by adding each of said compensating magnetic forces to said corresponding initial magnetic forces;

current calculating means for calculating current to be supplied to each of said electromagnets of said center magnetic force generating means and said side magnetic force generating means to generate said total magnetic forces by said electromagnets;

current supply means for supplying said currents to said corresponding electromagnets of said center magnetic force generating means and said side magnetic force generating means respectively.

7. A slicing machine according to claim 4, wherein said center magnetic force generating means and said side magnetic force generating means are arranged at a same distance from said central axis of said blade, and said center blade-position detecting means and said side blade-position detecting means are arranged at a same distance from said central axis of said blade on an inner side of said center magnetic force generating means and said side magnetic force generating means.

8. A slicing machine according to claim 1, wherein said center magnetic force generating means includes:
a housing made of a soft magnetic material;
at least one core made of said soft magnetic material which is fixed in said housing; and
coils installed on each of said cores.

9. A slicing machine according to claim 4, wherein said center magnetic force generating means and said center blade-position detecting means are fixed on a support, and moving means is provided for moving said support towards said direction of said central axis of said blade.

10. A slicing machine according to claim 1, wherein said center magnetic force generating means comprises:
a permanent magnet arranged opposite said cutting area of said blade with said partially cut slice disposed between said permanent magnet and said cutting area of said blade during said cutting operation; and
magnet actuating means for moving said permanent magnet towards said direction of said axis of said blade.

11. A slicing machine according to claim 1, wherein said center blade-position detecting means is an eddy current sensor.

12. A slicing machine according to claim 1, wherein said cutting edge of said blade is formed so that a cutting direction of said blade in said workpiece deviates from a direction perpendicular to said central axis of said blade and towards an opposite side of said magnetic force generating means.

13. A slicing machine for cutting a workpiece into slices, comprising:
(a) a circular-shaped internal rotary blade made of a ferromagnetic material, having an opening in a center thereof, and having a cutting edge at an inner peripheral margin thereof;

(b) blade rotating means for maintaining tension in said blade and for rotating said blade around a central axis thereof;

(c) work supporting means for supporting said workpiece and for positioning said workpiece inside said opening of said blade;

(d) moving means for moving at least one of said work supporting means and said blade rotating means to slice said workpiece by said blade;

(e) center blade-position detecting means for measuring a displacement, in a direction of said central axis of said blade, of a cutting area of said blade inserted in said workpiece during a cutting operation of said workpiece, wherein said detecting means is arranged opposite said cutting area of said blade so that a partially cut slice of said workpiece is disposed between said detecting means and said cutting area of said blade during said cutting operation;

(f) center magnetic force generating means for attracting said cutting area of said blade by generating magnetic force, wherein said magnetic force generating means is arranged opposite said cutting area of said blade so that said partially cut slice is disposed between said magnetic force generating means and said cutting area of said blade during said cutting operation;

(g) at least one side magnetic force generating means for attracting adjacent side areas of said cutting area of said blade by generating magnetic force, wherein each of said side magnetic force generating means are disposed apart from said center magnetic force generating means along a circumferential direction of said blade, and are opposed to each of said adjacent side areas of said blade;

(h) at least one side blade-position detecting means for measuring displacements of said adjacent side areas towards a direction of said central axis of said blade, wherein each of said side blade-position detecting means are disposed apart from said center blade-position detecting means along a circumferential direction of said blade, and are opposed to said adjacent side area of said blade;

(i) controlling means for controlling said magnetic force generated by each of said center magnetic force generating means and said side magnetic force generating means in accordance with output signals from said center magnetic force generating means and said side blade-position detecting means.

14. A slicing machine according to claim 13, wherein each of said center magnetic force generating means and said side magnetic force generating means comprises at least one electromagnet for attracting said blade.

15. A slicing machine according to claim 14, wherein said controlling means comprises:
initial magnetic force calculating means for calculating each initial magnetic force to be generated by each of said electromagnets of said center magnetic force generating means and said side magnetic force generating means, to respectively shift said cutting area and adjacent side areas of said blade to predetermined desired positions;

deviation calculating means for calculating deviations of actual positions from said desired positions of said cutting area and said adjacent side areas of said blade;

compensating magnetic force calculating means for calculating a compensating magnetic force to be added to each of said initial magnetic force of each of said electromagnets in accordance with said deviations;

total magnetic force calculating means for respectively calculating a total magnetic force by adding each of said compensating magnetic forces to said corresponding initial magnetic forces;

current calculating means for calculating current to be supplied to each of said electromagnets of said center magnetic force generating means and said side magnetic force generating means to generate said total magnetic forces by said electromagnets;

current supply means for supplying said current to each of said corresponding electromagnets of said center magnetic force generating means and said side magnetic force generating means respectively.

16. A slicing machine according to claim 13, wherein said center magnetic force generating means and said side magnetic force generating means are arranged at a same distance from said central axis of said blade, and said center blade-position detecting means and said side blade-position detecting means are arranged at a same distance from said central axis of said blade on an inner side of said center magnetic force generating means and said side magnetic force generating means.

17. A slicing machine according to claim 13, wherein said center magnetic force generating means and said center blade-position detecting means are fixed on a support, and moving means is provided for moving said support towards said direction of said central axis of said blade.

18. A slicing machine for cutting a workpiece into slices, comprising:

a circular-shaped internal rotary blade made of a ferromagnetic material, having an opening in a center thereof, and having a cutting edge at an inner peripheral margin thereof;

blade rotating means for maintaining tension in said blade and for rotating said blade around a central axis thereof;

work supporting means for supporting said workpiece and positioning said workpiece inside said opening of said blade;

moving means for moving at least one of said work supporting means and said blade rotating means to slice said workpiece by said blade;

center blade-position detecting means for generating a signal in response to an amount of a displacement of a cutting area of said blade to be inserted in said workpiece, wherein said center blade-position detecting means is arranged opposite said cutting area of said blade so that a partially cut slice of said workpiece is disposed between said center blade-position detecting means and said cutting area of said blade during a cutting operation of said workpiece;

center magnetic force generating means arranged opposite said cutting area of said blade, for generating a magnetic force to effectuate a displacement of said cutting area of said blade, said center magnetic force generating means being controllable to vary a magnitude of said magnetic force applied to said blade, said partially cut slice being disposed between said center magnetic force generating means and said cutting area of said blade during said cutting operation; and controlling means for controlling said magnetic force generated by said center magnetic force generating means in accordance with an output signal from said center blade-position detecting means.

* * * * *